US012691810B2

(12) United States Patent
Zantos

(10) Patent No.: US 12,691,810 B2
(45) Date of Patent: Jul. 28, 2026

(54) CARGO FIXTURE APPARATUS FOR SECURING CARGO

(71) Applicant: Westcoast Performance USA Inc., Anaheim, CA (US)

(72) Inventor: Robert Zantos, Santa Ana, CA (US)

(73) Assignee: Westcoast Performance USA Inc., Anaheim, CA (US)

( * ) Notice: Subject to any disclaimer, the term of this patent is extended or adjusted under 35 U.S.C. 154(b) by 317 days.

(21) Appl. No.: 18/630,709

(22) Filed: Apr. 9, 2024

(65) Prior Publication Data

US 2024/0336186 A1 Oct. 10, 2024

Related U.S. Application Data

(60) Provisional application No. 63/516,590, filed on Jul. 31, 2023, provisional application No. 63/495,185, filed on Apr. 10, 2023.

(51) Int. Cl.
B60P 7/08 (2006.01)
B60P 7/15 (2006.01)

(52) U.S. Cl.
CPC .............. B60P 7/0807 (2013.01); B60P 7/15 (2013.01)

(58) Field of Classification Search
CPC ......... B60P 7/0807; B60P 7/15; B60P 7/0815; B60P 3/077; B60P 3/075; B60T 3/00; B62H 3/04; B62H 3/00; B62H 3/12; B60R 9/06; B60R 9/10

USPC ......................................................... 410/102
See application file for complete search history.

(56) References Cited

U.S. PATENT DOCUMENTS

| | | | |
|---|---|---|---|
| 10,239,464 B1 * | 3/2019 | Dunn ........................ | B60R 9/10 |
| 11,358,512 B2 * | 6/2022 | Reyes-Crespo ........... | B60R 9/10 |
| 2003/0222191 A1 * | 12/2003 | Tsai ......................... | B62H 3/00 |
| | | | 248/354.1 |
| 2021/0039610 A1 * | 2/2021 | Krolski ................... | B60P 3/077 |

OTHER PUBLICATIONS

N/A—No known prior art.

* cited by examiner

*Primary Examiner* — Amy R Weisberg
*Assistant Examiner* — Daniel R Digiovannantonio

(57) ABSTRACT

The cargo fixture apparatus is a system which assists a user with securing their cargo, typically within the cargo area of a transportation vehicle. The cargo fixture apparatus includes a clamping block which may be mounted to a rail-like cross-member. The clamping block includes an upper jaw and a lower jaw which clamp down on the cross member. The upper jaw and lower jaw each have a load-transfer pin passing through them. The clamping force is provided by tightening one or more bolts which pass through the load-transfer pins. The cargo fixture apparatus may further include a mounting system for the cross-member which is vertically adjustable. The mounting system may include a security cover and locking system which help prevent unwanted tampering or theft of the mounting system. Some versions of the cargo fixture apparatus may be installed in pickup trucks, for example and without limitation: the Tesla Cybertruck.

20 Claims, 34 Drawing Sheets

500

502

502

501

901

901

910

CARGO FIXTURE APPARATUS FOR SECURING CARGO

CROSS-REFERENCE TO RELATED APPLICATIONS

This application claims benefit of priority from U.S. Provisional Application Ser. No. 63/495,185, filed Apr. 10, 2023 and U.S. Provisional Application Ser. No. 63/516,590, filed Jul. 31, 2023, the entire contents of which are hereby incorporated by reference.

BACKGROUND

Field of the Invention

This disclosure relates to an apparatus for securing cargo during transportation, more particularly it relates to a cargo fixture apparatus having at least one rail-like cross-member and one or more clamping block components which may be adjustably attached to the cross-member. The clamping blocks may serve a variety of cargo-securing functions. The clamping blocks may serve as anchor points for cargo restraints or the clamping blocks may serve as blocking features against which cargo may be secured.

SUMMARY

The disclosed apparatus enables a user to secure and safely transport their cargo using the cargo restraining system described.

The cargo fixture apparatus, also called the "cargo fixture," may have a rail-like cross-member, clamping blocks, and a means of removably or permanently fixing the cross-member within the cargo area of a transportation vehicle. A clamping block may comprise a set of opposing jaws which may be disposed around the cross-member such that they may be reversibly clamped to the cross-member. The user may loosen the jaws such that the clamping block may be slid along the cross-member to the desired location. When the clamping block is in the desired location the user may tighten the jaws of the clamping block to the cross-member. In some embodiments, if the user sufficiently loosens the jaws the clamping blocks may be removed entirely from the cross-member.

The cross-member may be mounted in a transportation vehicle, such as a pickup truck, by a variety of means. The cross-member may be constructed from any sufficiently long, rigid, resilient material. The outer surface of the cross-member may be relatively uniform and free of surface features which may inhibit the free sliding of the clamping blocks.

Some of the clamping blocks may be configured with surface geometry or surface features which serve as points of contact against which cargo may be secured. In some embodiments, the cargo-facing side of the clamping blocks have concave cups, herein called tire cups, which may support or cradle the tire or wheel of a motorcycle or a bicycle which the user wishes to transport. The user may insert the front or rear tire of a motorcycle or a bicycle into the tire cup before securing the motorcycle or bicycle with tension cargo restraints. The tire cups can serve to restrain the wheel's movement. In particular the left-to-right movement of the wheel may be restrained, as well as any rotational movement about the steering axis of a front wheel. Yaw movement and roll movement of the tire may be constrained by the tire cup.

Some of the clamping blocks may be configured with block tie-down anchors or anchor attachment features. Block tie-down anchors may be adapted to allow a user to apply tension cargo restraints, for example and without limitation fabric ratchet straps, chains, turnbuckles, or rope, between an article of cargo and a block tie-down anchor. In other embodiments a cargo restraint which acts on the cargo through compression may be used. In some embodiments, the cargo restraint (e.g., strap, cable, chain, etc.) may be engaged over, under, around, or through an article of cargo. In embodiments which use a two-ended cargo restraint, the second end of the cargo restraint may be applied to the original anchor point or to a second anchor point to secure or constrain the movement of the cargo.

BRIEF DESCRIPTION OF THE DRAWINGS

Other features, combinations, and embodiments will be appreciated by one having the ordinary level of skill in the art of cargo fixture mechanisms and accessories upon a thorough review of the following details and descriptions, particularly when reviewed in conjunction with the drawings, wherein.

DETAILED DESCRIPTION

Figure 1:
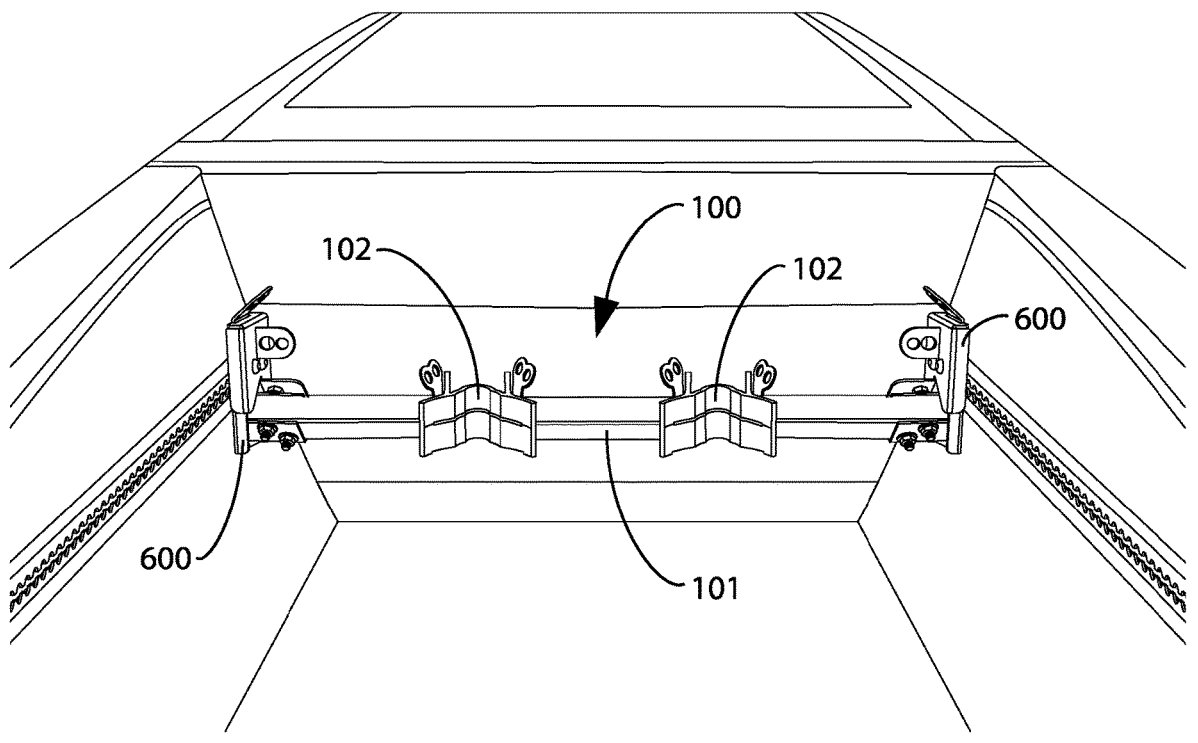
FIG. 1 shows a rear view of the cargo fixture apparatus mounted within the bed of a Cybertruck.
Figure 2:
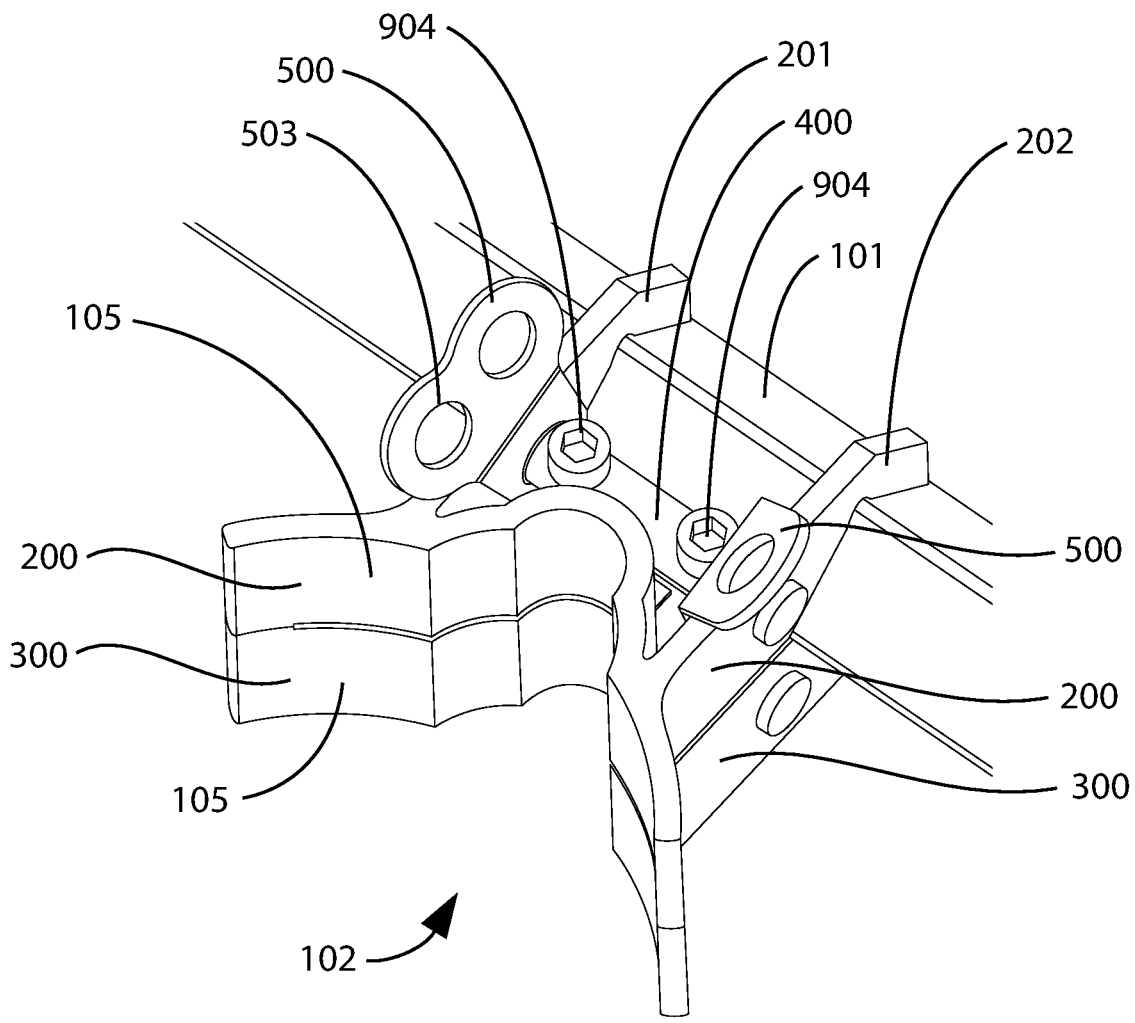
FIG. 2 shows a top isometric view of a clamping block.
Figure 3:
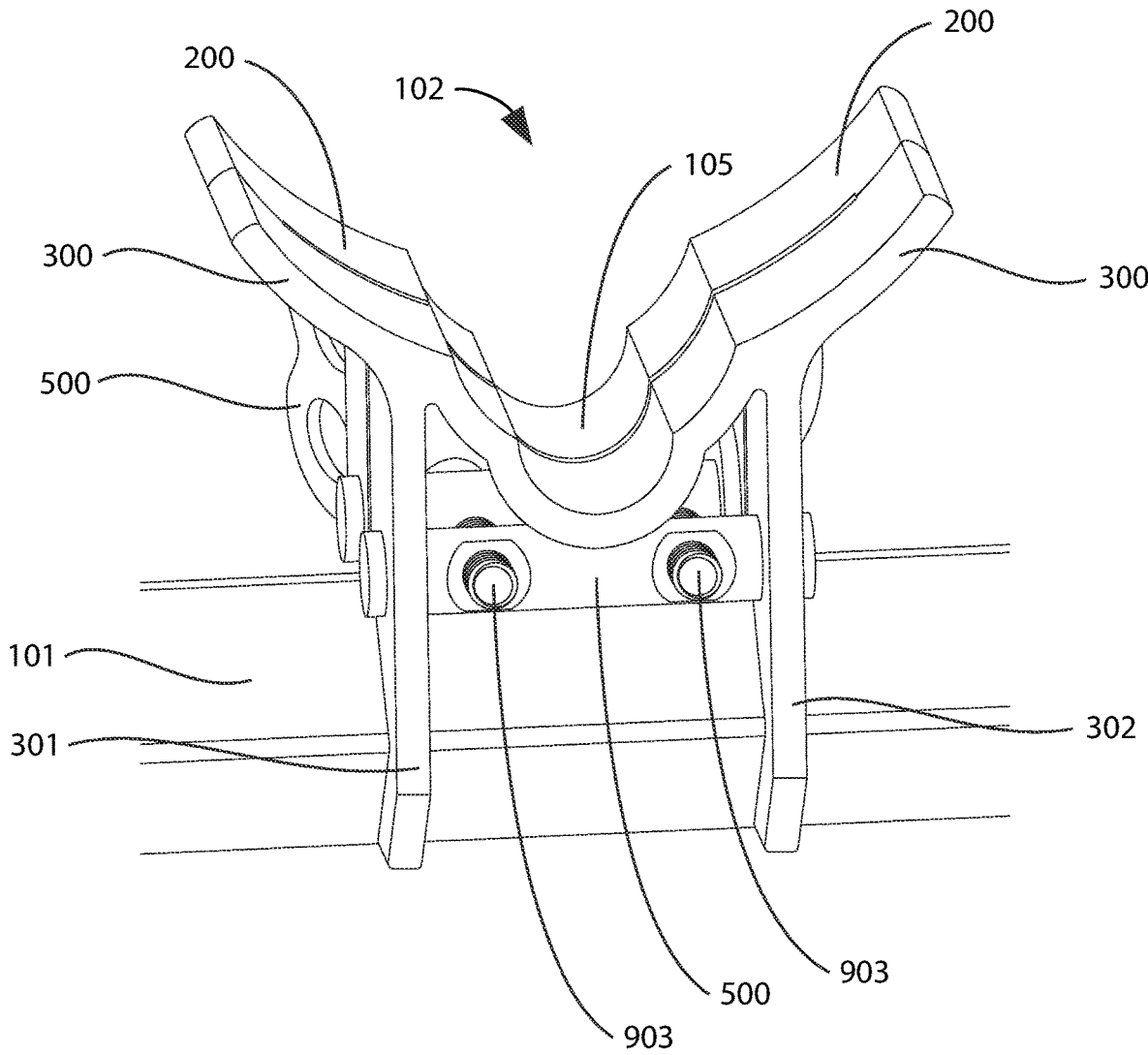
FIG. 3 shows a bottom isometric view of a clamping block.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

For purposes herein, reference numbers are provided in the drawings for illustrating certain features of embodiments. Where distinct figures of the drawings utilize a shared reference number, it can be appreciated that the feature corresponding to the shared reference number is the same or similar, perhaps observed from a different view, or observed with respect to a different embodiment deploying the same or similar feature.

For purposes herein, the term "coupled" means that the coupled components, articles, or systems are separable from each other.

The term "attached" means that the attached components, articles, or systems are not separable from each other.

The term "integrated" means that the integrated components, articles, or systems refer to features which together form a continuous body.

Unless explicitly defined herein, terms are to be construed in accordance with the plain and ordinary meaning as would be appreciated by one having skill in the art.

General Description of Embodiments

The cargo fixture apparatus comprises a rail-like cross-member, one or more clamping blocks, and a means of fixing the cross-member in place. In some embodiments, the cargo fixture apparatus may be used for transporting cargo in a vehicle. However, the use of the disclosed cargo fixture apparatus in stationary applications, following largely the same procedures described herein for use in transportation vehicles, is contemplated. In some embodiments, the mounting system which secures the cargo fixture apparatus within the cargo area has been specifically designed to be installed within the truck bed of a Tesla Cybertruck. More specifically the Cybertruck has an L-track mounting rack system. In some embodiments the mounting plate mounting holes and the mounting plate bolts are configured to be installed against the L-track mounting rack system. Other mounting systems to mount the cross member besides the L-track mounting rack system are contemplated.

The cargo fixture apparatus has a cross-member which may be attached to the cargo area. The cross-member may be permanently or removably mounted within the cargo area using a variety of mounting system types. The mounting system may be integrated with the cross-member, or the mounting system may have a plurality of fixtures, clamps, or brackets which may attach the cross-member to the cargo area. The system of mounting fixtures, clamps, or brackets is referred to as the mounting system herein. In some embodiments, the cross-member may be welded in-place. In some embodiments, the cross-member may be attached to the cargo area with bracket components. The means of attachment described below include weld attachment, bracket attachment. Other means of attachment may be known by one skilled in the art.

In some embodiments, the cross-member may be mounted within a cargo area by attaching at its first end and its second end, leaving the middle length of the cross-member without attachment locations. In some embodiments, the cross-member may be attached at intervals along its middle length. This may be accomplished by attaching the backside of the cross-member to the cargo area. In some embodiments, these backside attachment points may be designed to attach to an area of the cross-member which does not obstruct the free movement of the clamping blocks. In some embodiments, the attachment locations may be designed to attach to an area of the cross-member which does obstruct the clamping blocks with the knowledge that clamping blocks may not be able to freely slide past those attachment locations. In some embodiments, the jaw arms of the upper and lower jaws may be modified (e.g., the tip of the jaw arms may be shortened) to accommodate a cross-member attachment system.

In some embodiments, the cross-member may be constructed out of a solid rod. In some embodiments, the cross-member may be constructed out of tubing. In some embodiments, the cross-member may be constructed out of steel tubing. Suitable metallic materials include but are not limited to, stainless steel, steel, aluminum. In some embodiments, the cross-member material and geometry may follow American Society for Testing and Materials (ASTM) standards regarding the cross-members shape, wall thickness, and material composition. In some embodiments, the cross-member may be oriented at an angle between 30 degrees and 60 degrees with respect to horizontal. In some embodiments, the mounted square tubing cross-sectional profile of the cross-member is rotationally oriented to 45 degrees with respect to horizontal. In other embodiments, the cross-sectional profile of the cross-member may be configured in other rotational orientations.

A plurality of clamping blocks may be coupled to the cross-member. In some embodiments, the clamping blocks may be installed at any point along the cross-member. In some embodiments, the user may adjust the location of a clamping block by loosening the jaws of the clamping block, sliding the clamping block along the cross-member, and retightening the jaws of the clamping block in the desired location.

The clamping block comprises at least an upper jaw, a lower jaw, an upper load-transfer pin, a lower load-transfer pin, and a plurality of clamp bolts. The upper load-transfer pin may be coupled to, attached to, retained by, or integrated with the upper jaw, and the lower load-transfer pin may be coupled to, attached to, or integrated with the lower jaw. In some embodiments, the upper jaw, a lower jaw, an upper load-transfer pin, a lower load-transfer pin, or some combination thereof may be integrated with each other. In some embodiments, the upper jaw and/or the lower jaw may have a clamp end and a block end. The clamp end of the jaws contacts the cross-member. The block end of the upper jaw contacts the block end of the lower jaw. In some embodiments the block end of the lower jaw and the block end of the upper jaw may be integrated with each other. In such embodiments, the point of connection between the distal end of the upper jaw and the distal end of the lower jaw may be configured to flex or elastically deform upon tightening of the jaws towards each other.

In some embodiments, the upper and lower load-transfer pins have a plurality of holes. These holes may be oriented perpendicularly or approximately perpendicularly to the central axis of the pin. A plurality of clamp bolts may pass through the upper and lower load-transfer pins, coupling the pins together. In some embodiments, the upper and lower load-transfer pins may be brought towards each other by tightening the clamp bolt or bolts which connect them, which may bring the jaws in to compression around the cross-member.

In some embodiments, each clamping block has two jaws, an upper jaw and a lower jaw. In some embodiments, the upper jaw may have two contact arms which are geometrically shaped to be clamped to the top side of the cross-member. In some embodiments, the upper jaw may have two lateral apertures, referred to as the upper contact arm apertures, through the contact arms such that the upper load-transfer pin may be inserted through the lateral apertures. Similarly, in some embodiments, the lower jaw may have two contact arms which are geometrically configured to be clamped to the bottom side of the cross-member. In some embodiments, the lower jaw may have two lateral apertures, referred to as the lower contact arm apertures, through the contact arms such that the lower load-transfer pin may be inserted through the lateral apertures.

The upper load-transfer pin may be an elongated member with a longitudinal axis. In some embodiments, the upper load-transfer pin may be generally cylindrically shaped. In some embodiments, the upper load-transfer pin may have a plurality of through holes penetrating the pin. In some embodiments, the upper load-transfer pin may be radially symmetrical about its longitudinal axis, except for the through holes. In some embodiments, there are two through holes penetrating the pin. In some preferred embodiments, these through holes are perpendicular to the pin's central axis and pass through the pin's central axis. The through holes in the upper load-transfer pin may be adapted to allow clamp bolts to pass through the hole. To tighten the jaws of the clamping block the user may tighten the clamp bolts which pass through the load-transfer pins.

The lower load-transfer pin may be an elongated member with a longitudinal axis. In some embodiments, the lower load-transfer pin may be generally cylindrically shaped. In some embodiments, the lower load-transfer pin may have a plurality of threaded holes fully or partially penetrating the pin. In some embodiments, the lower load-transfer pin may be radially symmetrical about its longitudinal axis, except for the through holes. In some embodiments, there are two threaded holes in the lower load-transfer pin. In some preferred embodiments, these threaded holes are perpendicular to the pin's central axis and pass through the pin's central axis. In some embodiments, the threaded holes in the lower load-transfer pin may be adapted to allow a clamp bolt to be threaded into the threaded hole in the lower load-transfer pin. In some embodiments, one or more clamp bolts may be inserted through the upper load-transfer pin and threaded into the lower load-transfer pin.

In some embodiments, the holes in the lower load-transfer pins may lack threads. In those embodiments, a clamping bolt may be disposed through a hole in the upper load-transfer pin, through a hole in the lower load-transfer pin, and secured with a threaded nut applied to the clamp bolt below the lower load-transfer pin.

In some embodiments, the upper and lower pins may have a first and second end. In some embodiments, one, some, or all of the upper and lower pins may have pin shoulder features, pin slots, or other suitable pin diameter altering feature, located at or near the first and/or second ends of the load-transfer pins. In some embodiments, a shoulder feature is present at the first and second end of both the upper load-transfer pin and the lower load-transfer pin. In some embodiments, the shoulder features may be characterized by a decrease in pin diameter forming a shelf transition or conical transition from the larger interior pin diameter to the smaller diameter shoulder at both ends of the pin.

In some embodiments, the longitudinal length of the larger interior diameter of the upper pin may be shorter than the distance between the contact arms of the upper jaw. Similarly, in some embodiments, the longitudinal length of the larger interior diameter of the lower pin may be shorter than the distance between the contact arms of the lower jaw. In some embodiments, the slot may be characterized by a decrease in pin diameter adjacent to an increase in pin diameter, thereby forming a slot between an interior pin diameter and a most distal pin diameter.

In some embodiments, as the through bolts are tightened the upper and lower load-transfer pins may be drawn together. As the upper and lower pins are drawn together the shoulder features of the upper pin may be pulled against the inner surface of the lateral holes which penetrate the upper contact arms. In some embodiments, this tightened position may cause the upper pin to be captured between the upper contact arms such that the shelf transitions between the outer shoulders and the wider interior pin diameter of the pin may prevent the pin from moving longitudinally. Similarly, in some embodiments, as the upper and lower pins are drawn together the smaller diameter shoulder features of the lower pin may be pulled against the inner surface of the lateral holes which penetrate the lower contact arms. In this tightened position the lower pin may be captured between the lower load-transfer arms such that the shelf transitions between the outer shoulders and the interior section of the pin prevent the pin from moving longitudinally.

In some embodiments, the rear facing surfaces of the upper and/or lower jaw may be configured with cargo blocking surfaces. In some embodiments, these blocking surfaces may be concave cups designed to receive the tire of a wheeled vehicle, for example and without limitation a bicycle or a motorcycle. In some embodiments, there may be a variety of tire cup sizes arranged in a terraced pattern, one on top of the other, such that the tire cup may receive a variety of tire sizes. The tire cup embodiment of the clamping blocks allows the user to insert and secure the tire of a wheeled vehicle, such as a bike or motorcycle, into the tire cup. The tire cup may then help to restrain the tire of the bike or motorcycle during transportation.

In some embodiments, the tire cup of the lower jaw may extend downward such that wheeled vehicles with smaller diameter wheels may contact the tire cup without requiring the user to adjust the clamping block or the cross-member downward. Similarly, in some embodiments, the tire cup of the upper jaw may extend upward such that wheeled vehicles with larger diameter wheels may contact the tire cup without requiring the user to adjust the clamping block or the cross-member upward. In some embodiments, the clamping block may be adapted with one or more dedicated cargo blocking surfaces.

Cargo blocking surfaces are surfaces or geometries formed by the clamping block against which the cargo may be secured. In some embodiments, a rearward, cargo-facing surface of the upper jaw and a rearward, cargo-facing surface of the lower jaw form a kind of cargo blocking surface. A cargo blocking surface may form one or more concave, generally "U-shaped" surfaces, referred to herein as a tire cups. In one embodiment, the user may insert the tire or wheel of a wheeled vehicle into the cargo blocking surface (e.g., a tire cup) such that as cargo restraints are applied to the cargo (e.g., a motorcycle, e-bike, bicycle, etc.) the cargo is secured against the cargo blocking surface.

In some embodiments, the clamping block and/or cargo blocking surface may be sized or shaped to reduce contact interference between adjacently secured wheeled vehicles. For example, the cargo blocking surface may be angled such that a front wheel, when inserted into the angled cargo blocking surface, is angled with respect to the longitudinal axis of the wheeled vehicle. Stated simply, the cargo blocking surface may be adapted to turn the front wheel of the motorcycle/bike such that the handlebars of adjacent motorcycles/bikes do not contact each other. The angled-front-wheel configuration may also allow more motorcycles/bikes to be secured in the cargo area than would otherwise be feasible without having turned handlebars.

In some embodiments, the clamping blocks may be configured with block tie-down anchors. The block tie-down anchors may be removably coupled to a clamping block, fixedly attached to a clamping block, or an integrated feature disposed on a clamping block. In some embodiments, the block tie-down anchors may have an anchor attachment feature which couples or attaches the block tie down anchor to the block. In some embodiments, the anchor attachment feature may be an anchor hole such that the upper load-transfer pin may pass through the anchor hole when the upper load-transfer pin is installed in the upper jaw.

The block tie-down anchor or clamping block may be configured with a variety of anchor attachment features which enable a user to apply a cargo restraint to the block tie-down anchor or clamping block. An anchor attachment feature may be a plurality of holes, hooks, or other suitable geometric feature, which enables a user to couple a tension cargo restraint, such as a tie-down, to the anchor attachment feature. To summarize, the anchor hole may couple or attach the block tie-down anchor to the clamping block. The anchor attachment feature may be used to couple a cargo restraint to the block tie-down anchor.

In general, a clamping block may have one or more block tie-down anchors, one or more anchor attachment features, one or more cargo blocking surfaces, or some combination thereof. A tie-down anchor is not a required component for all clamping blocks.

In some embodiments, the cargo fixture apparatus is coupled to the cargo area by a mounting system. Many possible mounting systems are contemplated. A mounting system may include a plurality of mounting components which receive and secure the cross-member. In some embodiments, the mounting system may comprise a mounting plate, a cross-member receiver bracket, and mounting plate bolts. In other embodiments, the mounting plate system may comprise a mounting plate, a cross-member receiver bracket, mounting plate bolts, a security cover, and security cover bolts.

The mounting plate may be a panel that is coupled or attached to the cargo area. The cross-member receiver bracket receives and secures the cross-member. In some embodiments, the cross-member receiver bracket is attached to the mounting plate. In other embodiments, the cross-member receiver bracket and the mounting plate may be integrated with each other monolithically.

The mounting plate or mounting system may be configured with a mounting plate anchor attachment feature. In some embodiments, the mounting plate anchor attachment feature may be a mounting plate tie-down anchor. A mounting plate anchor attachment feature allows the user to apply a cargo restraint from the mounting plate or mounting system to the cargo. The mounting plate tie-down anchor allows the user to apply a cargo restraint in tension from the mounting plate or mounting system to the cargo. The mounting plate anchor attachment feature may be removably coupled to the mounting system or a mounting plate, fixedly attached to the mounting system or a mounting plate, or an integrated feature disposed on the mounting system or a mounting plate.

In some embodiments, the cargo fixture apparatus includes a security cover. The security cover may be a panel which covers and protects the cargo fixture apparatus, and the mounting system more specifically, from unwanted tampering or vandalism. The security cover may protect key components, such as the mounting bolts and/or the cross-member bolts, by covering them or inhibiting access to them. In some embodiment, the security cover may have a bolt blocking feature which prevents or inhibits access to key articles of hardware such as the cross-member bolts. If the security cover is installed and a thief attempts to remove the cross member from the cross-member receiver bracket, they may unscrew the nuts from the cross-member bolts, but the bolt blocking feature may prevent the thief from removing the cross-member bolts such that the cross-member remains reattained by the cross-member bolts. In some embodiments, the security cover is secured via tamper-resistant security cover bolts.

In some embodiments, the mounting system will include a bracket lock feature such that the user may lock cargo to the mounting system. The lock feature may be designed to inhibit a would-be thief from accessing the lock feature, thereby contributing to the overall security of the cargo fixture apparatus and the locked and secured cargo.

Some components of the cargo fixture apparatus and related system described herein may be manufactured and/or assembled in accordance with the conventional knowledge and level of a person having skill in the art.

While various details, features, and combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

Manufacturing

Generally, the cargo fixture apparatus is made of metallic materials. Otherwise, the various components of the cargo fixture apparatus can be fabricated in accordance with the level and knowledge of one having skill in the art.

Each of the components of the cargo fixture apparatus and related system described herein may be manufactured and/or assembled in accordance with the conventional knowledge and level of a person having skill in the art.

While various details, features, and combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

Now turning to the drawings, FIG. 1 shows a rendering of the cargo fixture apparatus (100) having a cross-member (101) and clamping blocks (102) coupled to the cross-member. FIG. 14-FIG. 17 shows one embodiment of the cargo fixture as constructed.

Figure 8:
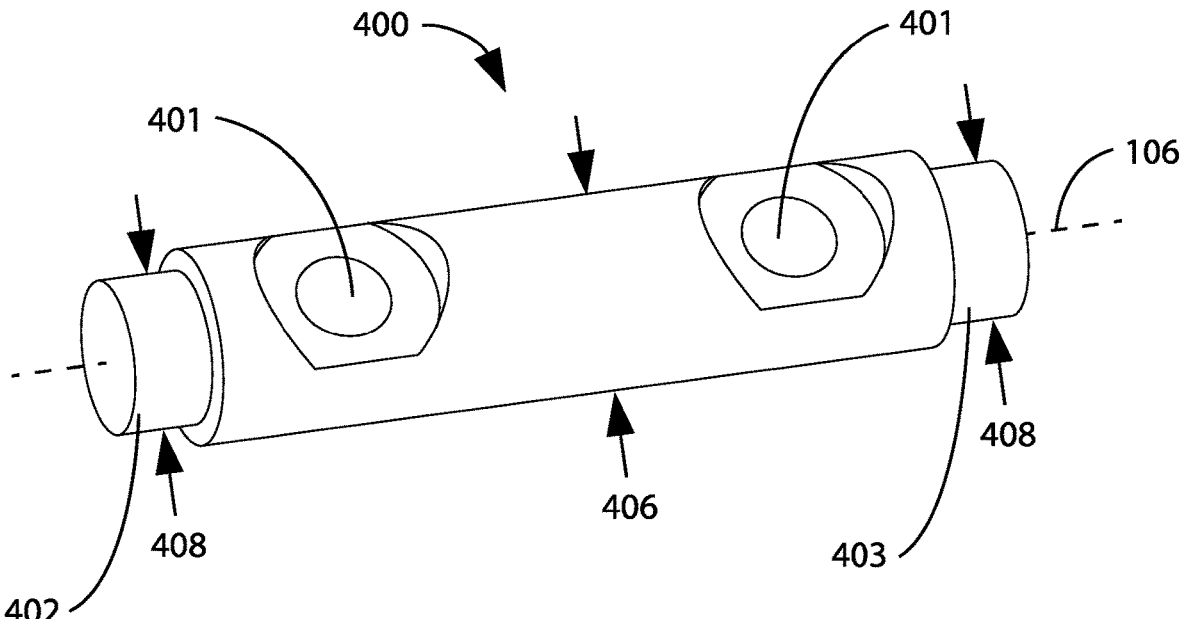
FIG. 8 shows an isometric view of an upper load-transfer pin in accordance with a first illustrated embodiment of the upper load-transfer pin.
Figure 9:
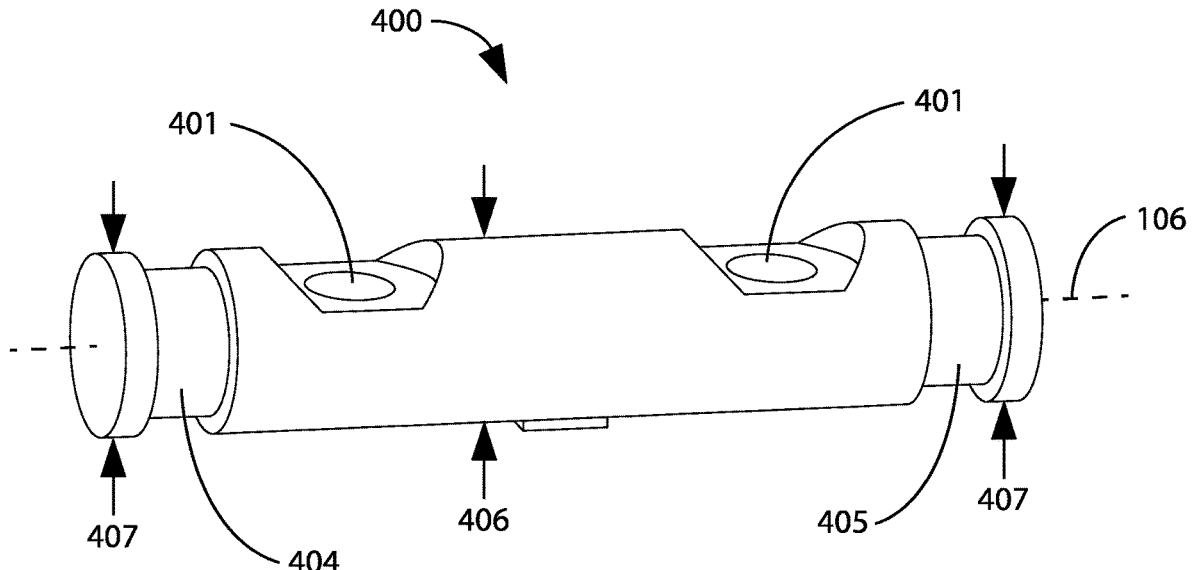
FIG. 9 shows an isometric view of an upper load-transfer pin in accordance with a second illustrated embodiment of the upper load-transfer pin.
Figure 10:
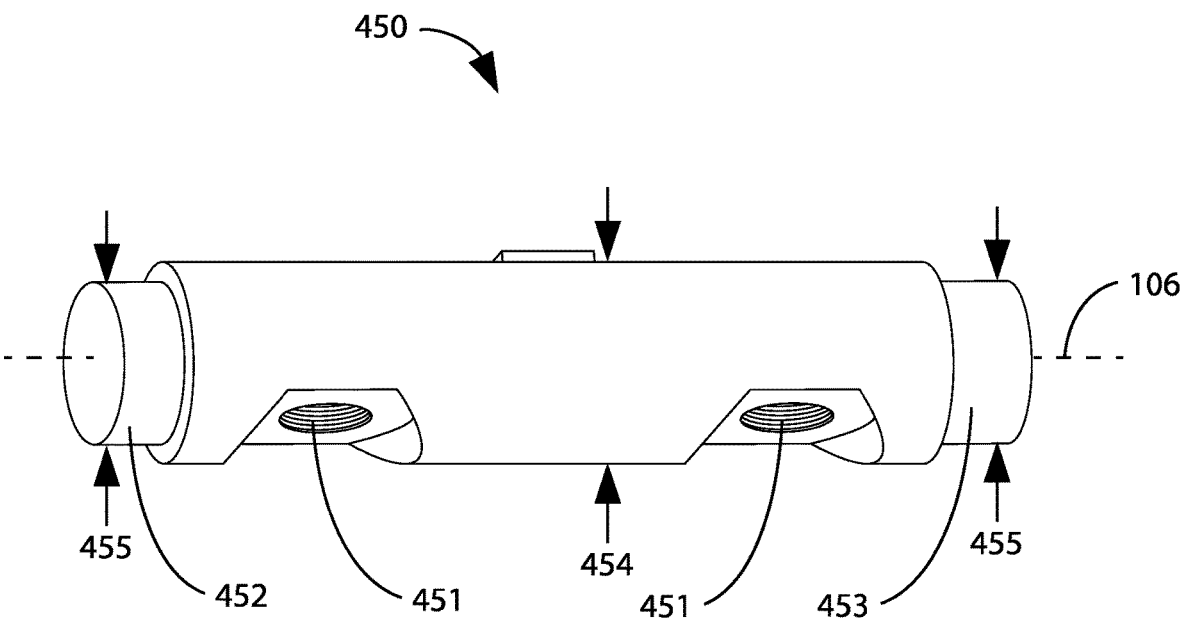
FIG. 10 shows an isometric view of a lower load-transfer pin in accordance with a first illustrated embodiment of the upper load-transfer pin.

In FIG. 2-FIG. 7 the clamping block (102) and its associated components are shown. The clamping block has an upper jaw (200), a lower jaw (300), an upper load-transfer pin (400), a lower load-transfer pin (450), and a plurality of block tie-down anchors (500). The upper jaw has two upper contact arms (201, 202) which are disposed above the cross-member and the lower jaw has two lower contact arms (301, 302) which are disposed below the cross-member. Each upper contact arm has an upper jaw clamp end (207) and an upper jaw block end (208). Each upper contact arm has an upper jaw contact surface (209) disposed on the lower side of the upper jaw block end which makes contact with the lower jaw contact surface (309) when the clamping block is clamped to the cross-member. Each lower contact arm has a lower jaw clamp end (307) and an upper jaw block end (308). Each lower contact arm has a lower jaw contact surface (309) disposed on the upper side of the lower jaw block end which makes contact with the upper jaw contact surface (209) when the clamping block is clamped to the cross-member. The embodiment shown in FIG. 2 has two upper jaw contact surfaces and two lower jaw contact surfaces. The upper contact arms have upper contact arm apertures (203) such that the upper load-transfer pin (400) may be inserted. Similarly, the lower contact arms have lower contact arm apertures (303) such that the lower load-transfer pin (450) may be inserted. Two clamp bolts (904) are passed through the upper load-transfer pin through holes (401) and threaded into the lower load-transfer pin threaded holes (451). In FIG. 8-FIG. 10 the interior pin diameters (406, 454), most distal pin diameters (407), and the small diameter shoulders (408, 455) are identified.

Figure 4:
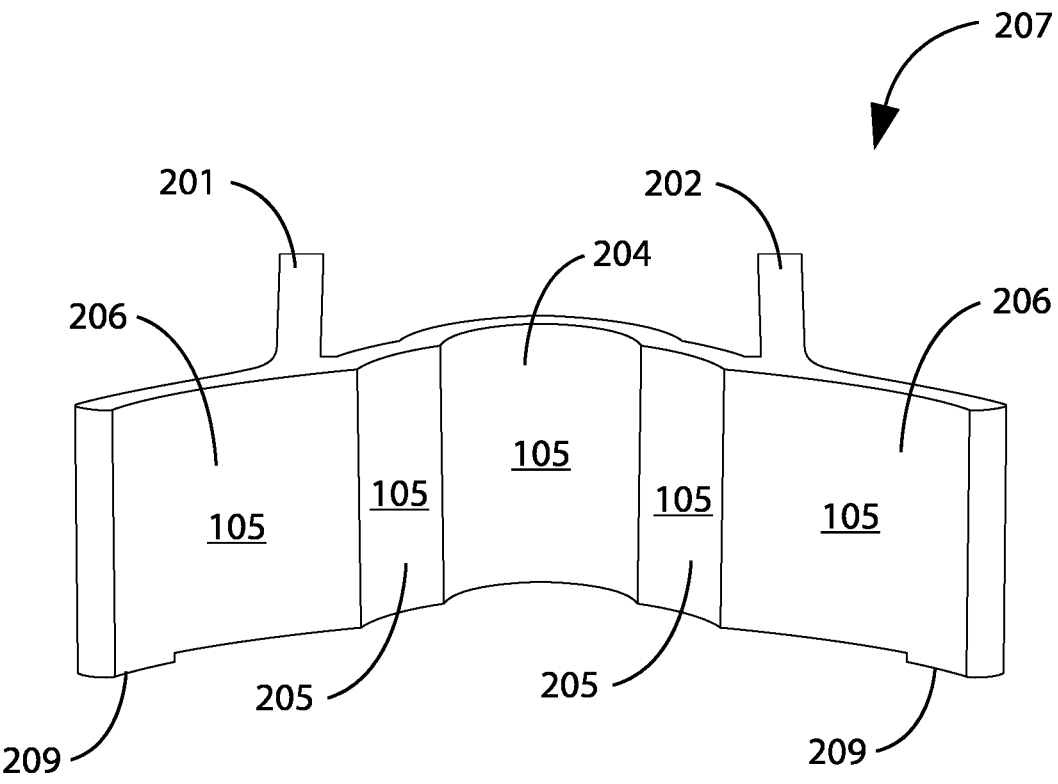
FIG. 4 shows a rear view of an upper jaw.
Figure 5:
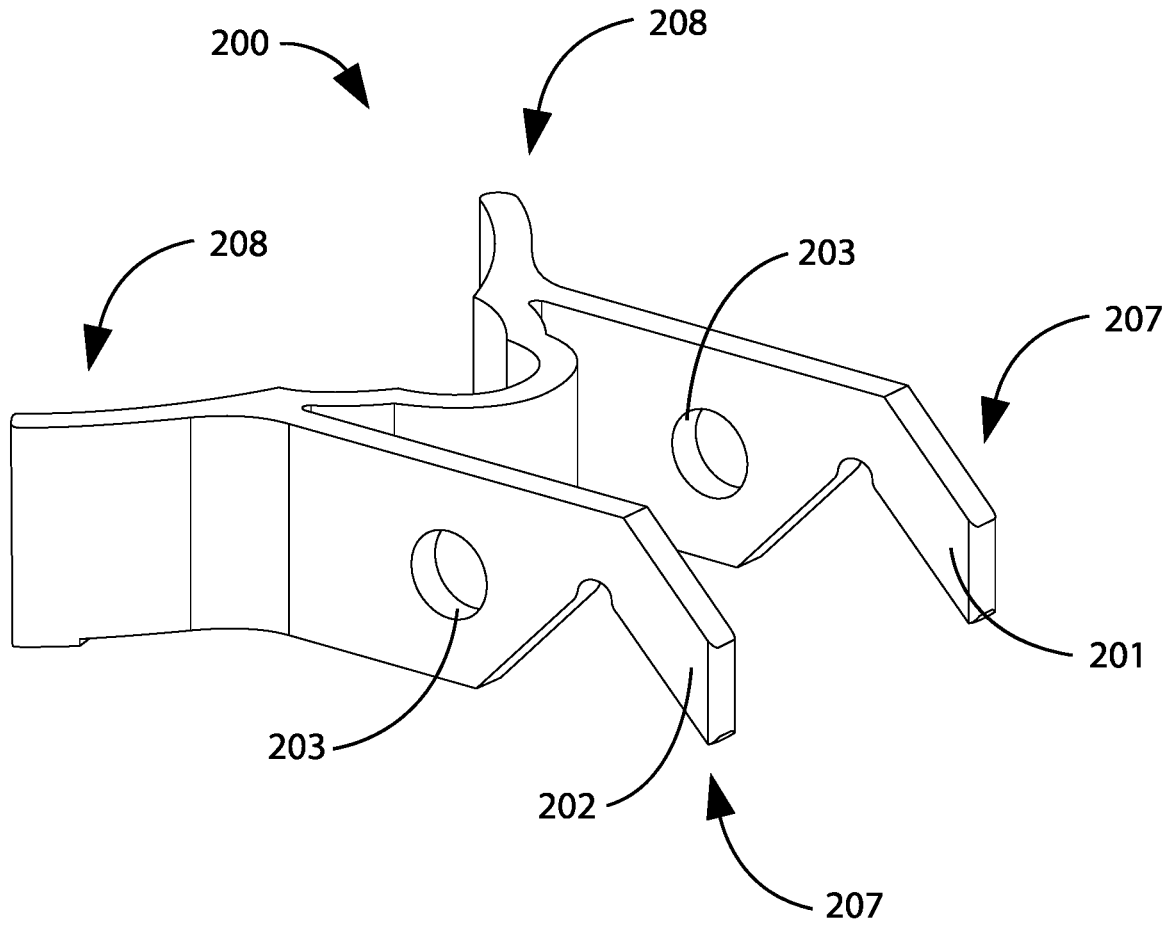
FIG. 5 shows an isometric view of an upper jaw.
Figure 6:
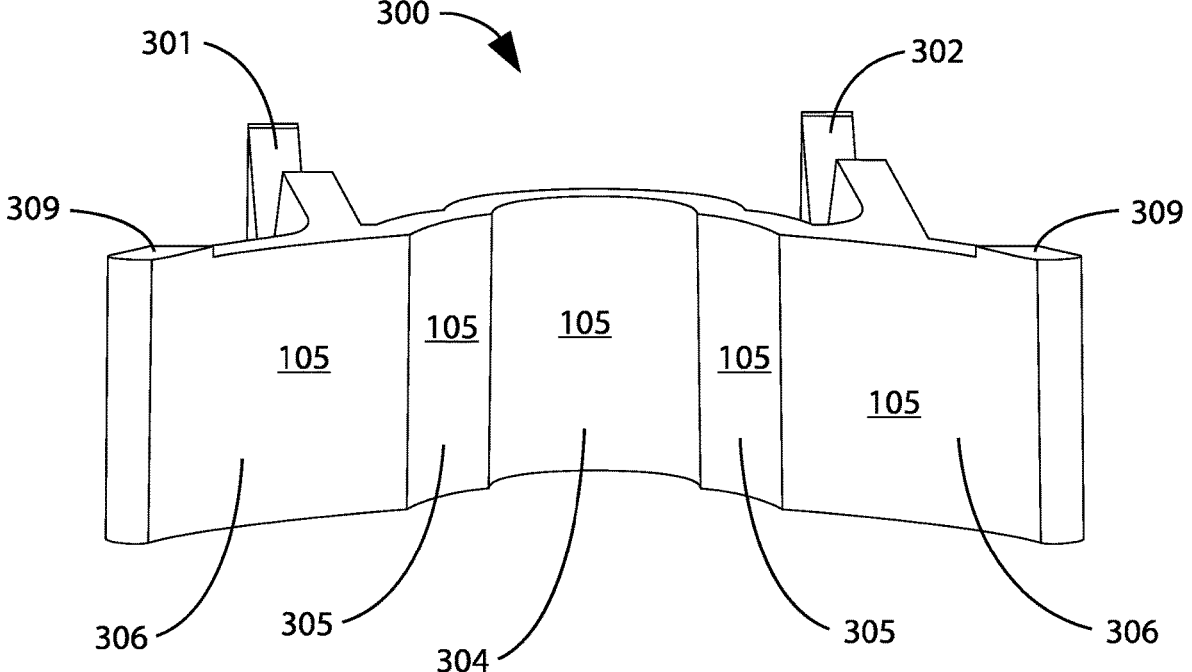
FIG. 6 shows a rear view of a lower jaw.
Figure 7:
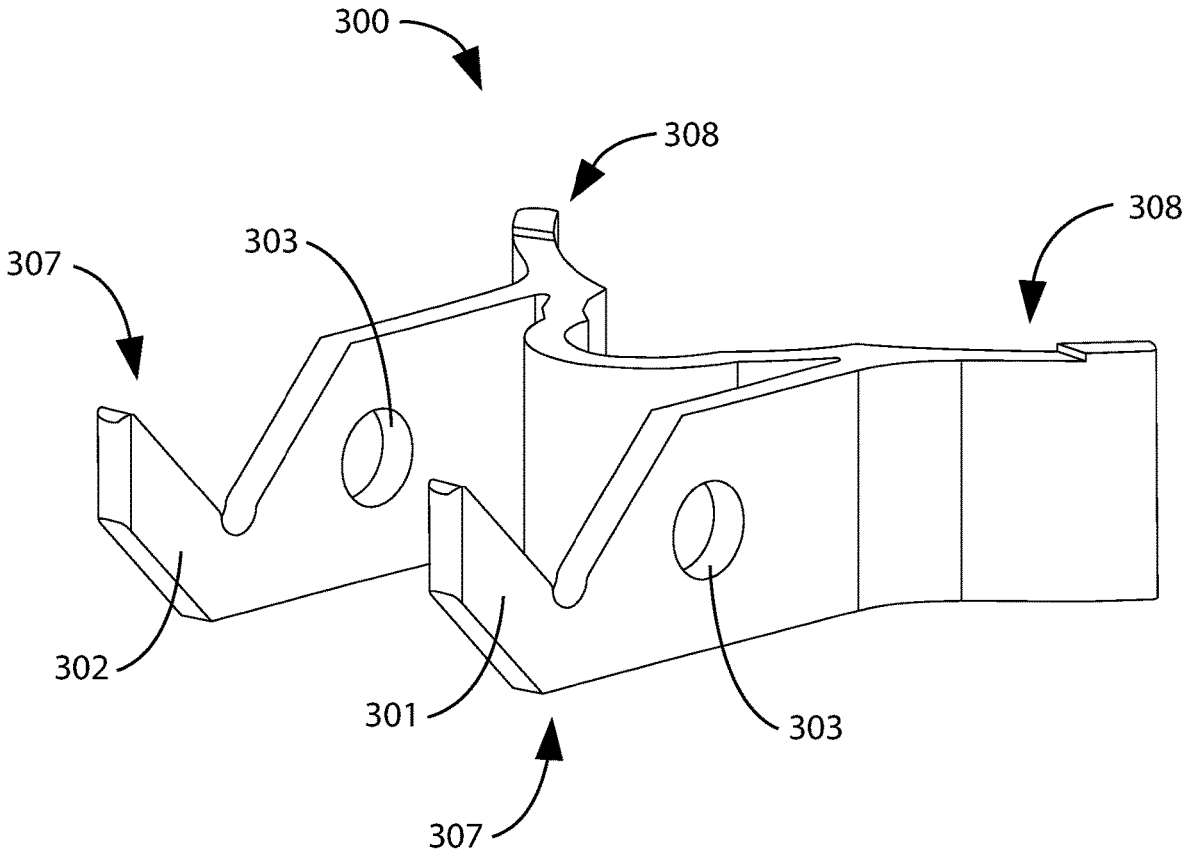
FIG. 7 shows an isometric view of a lower jaw.

In FIG. 4 and FIG. 6 the rear of the upper jaw forms a tire cup (103) feature. The rear of the lower jaw forms a tire cup (103) feature as well. These tire cup features may include various tire cup sizes to fit various wheeled vehicle tire sizes. The upper tire cup feature is formed from an upper tire cup1 (204), upper tire cup2 (205), and upper tire cup3 (206). The lower tire cup feature is formed from a lower tire cup1 (304), lower tire cup2 (305), and lower tire cup3 (306).

The upper load-transfer pins (400) shown in FIG. 8-FIG. 9 have upper load-transfer pin through holes (401) perpendicularly oriented to a central axis (106) to receive the clamp bolts. The lower load-transfer pin (450) shown in FIG. 10 has lower load-transfer pin threaded holes (451) perpendicularly oriented to a central axis (106) to receive the clamp bolts. The load-transfer pin in FIG. 8 is configured with two upper load-transfer pin shoulders (402, 403). The load-transfer pin in FIG. 9 is configured with two upper load-transfer pin slots (404, 405). The load-transfer pin in FIG. 10 is configured with tow lower load-transfer pin shoulders (452, 453).

Figure 11:
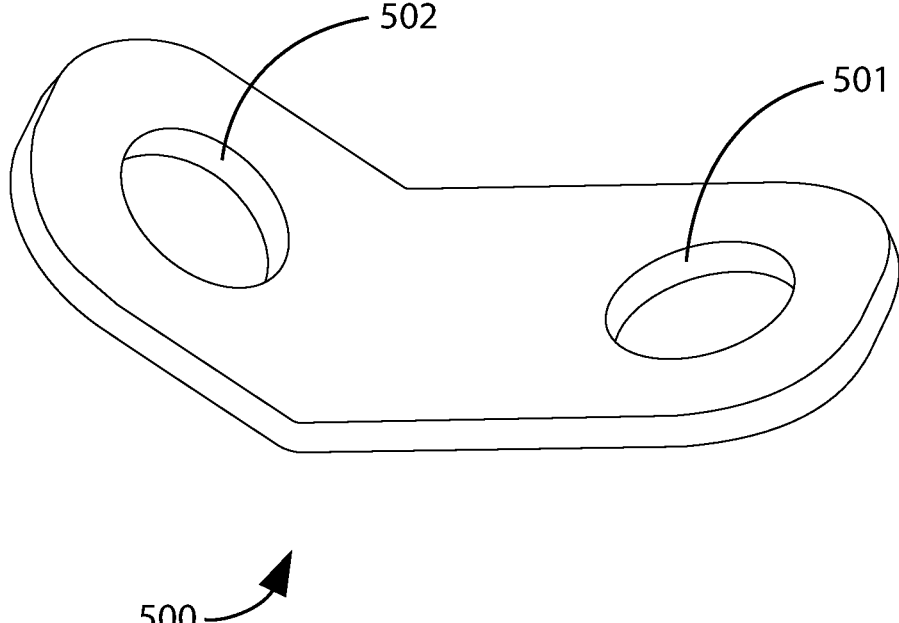
FIG. 11 shows an isometric view of a block tie-down anchor in accordance with a first illustrated embodiment of the block tie-down anchor.
Figure 12:
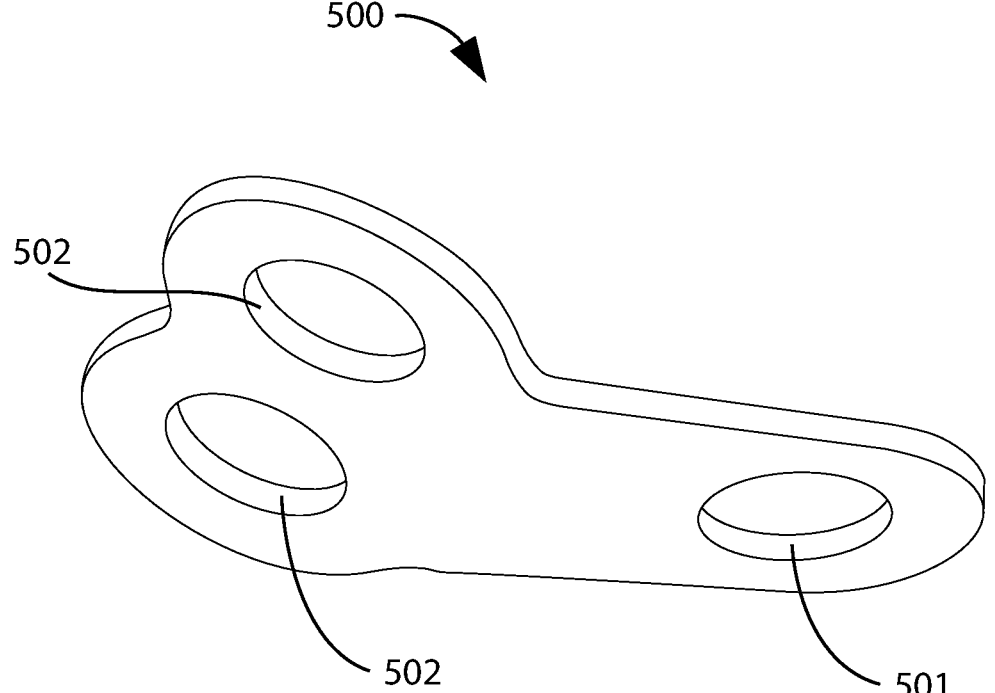
FIG. 12 shows an isometric view of a block tie-down anchor in accordance with a second illustrated embodiment of the block tie-down anchor.
Figure 13:
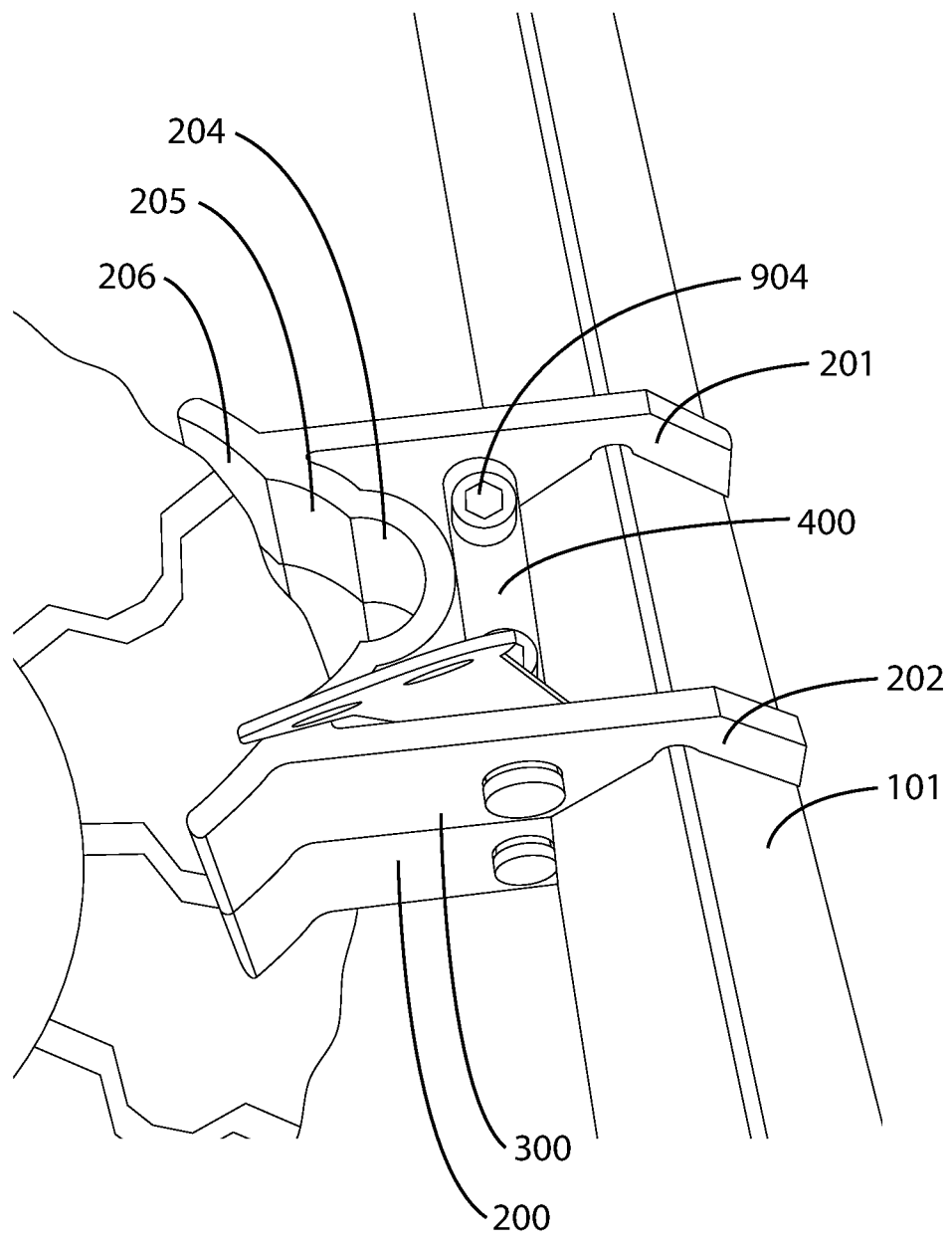
FIG. 13 shows an isometric view of a clamping block installed on a cross-member.
Figure 14:
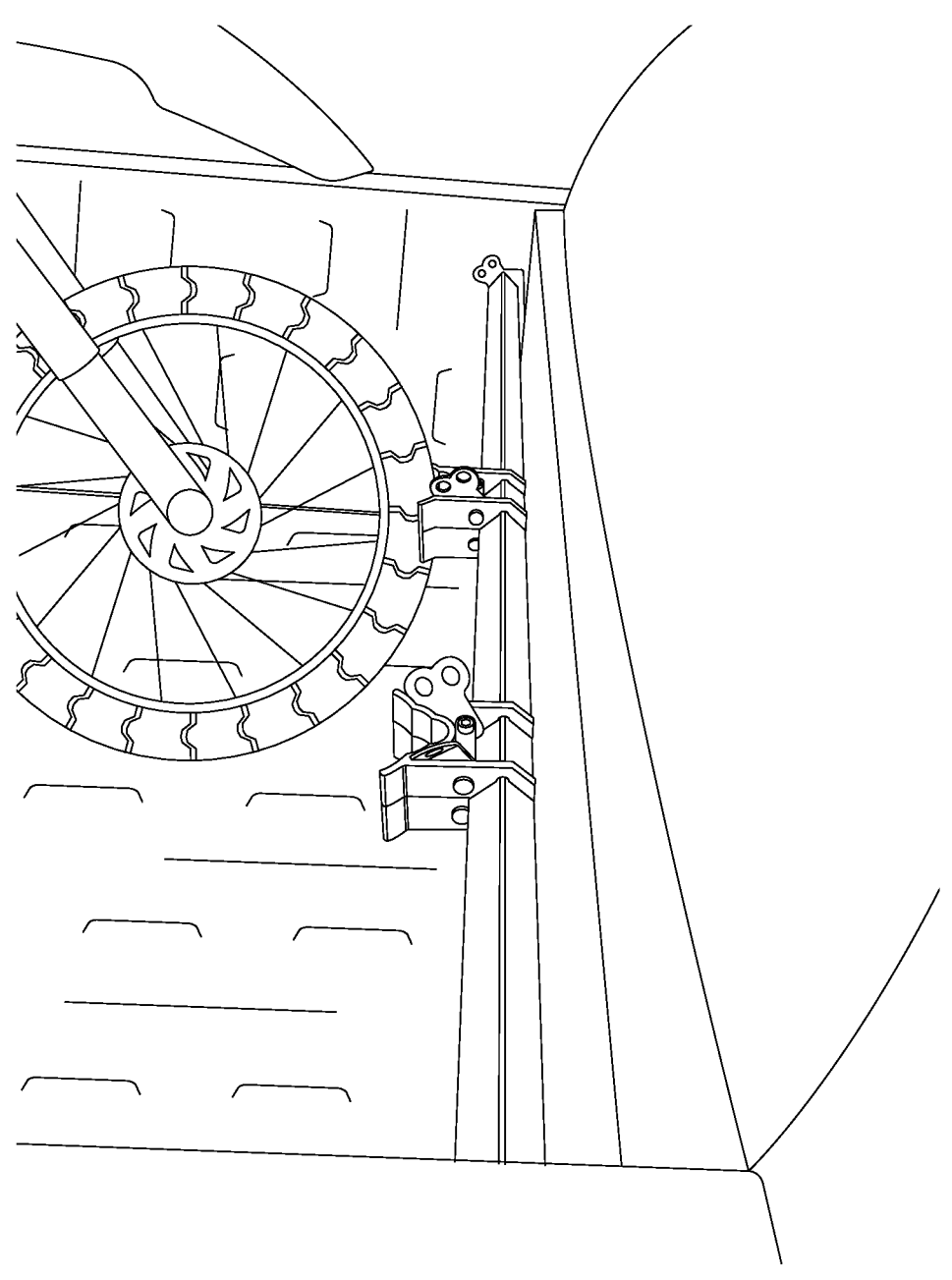
FIG. 14 shows a picture of a cargo fixture apparatus installed in a transportation vehicle.

The clamping blocks (102) can be configured with block tie-down anchors (500), which are shown in detail in FIG. 11 and FIG. 12. The block tie-down anchors have anchor holes (501) which can be coupled to the blocks. The block tie-down anchors also have anchor attachment features (502) which allow the user to apply cargo restraints to the block tie-down anchors.

Figure 23:
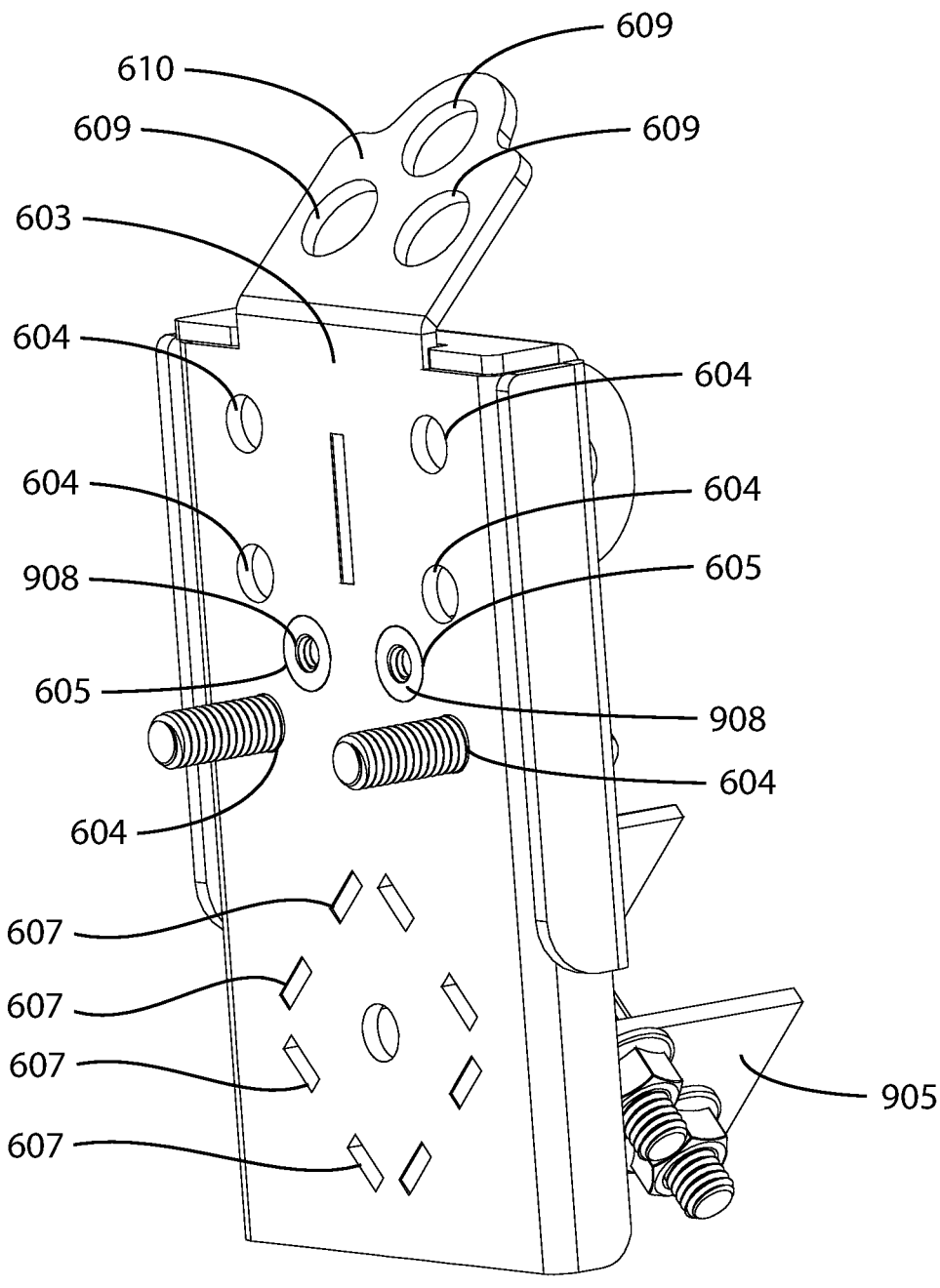
FIG. 23 shows an isometric view of a mounting system.
Figure 24:
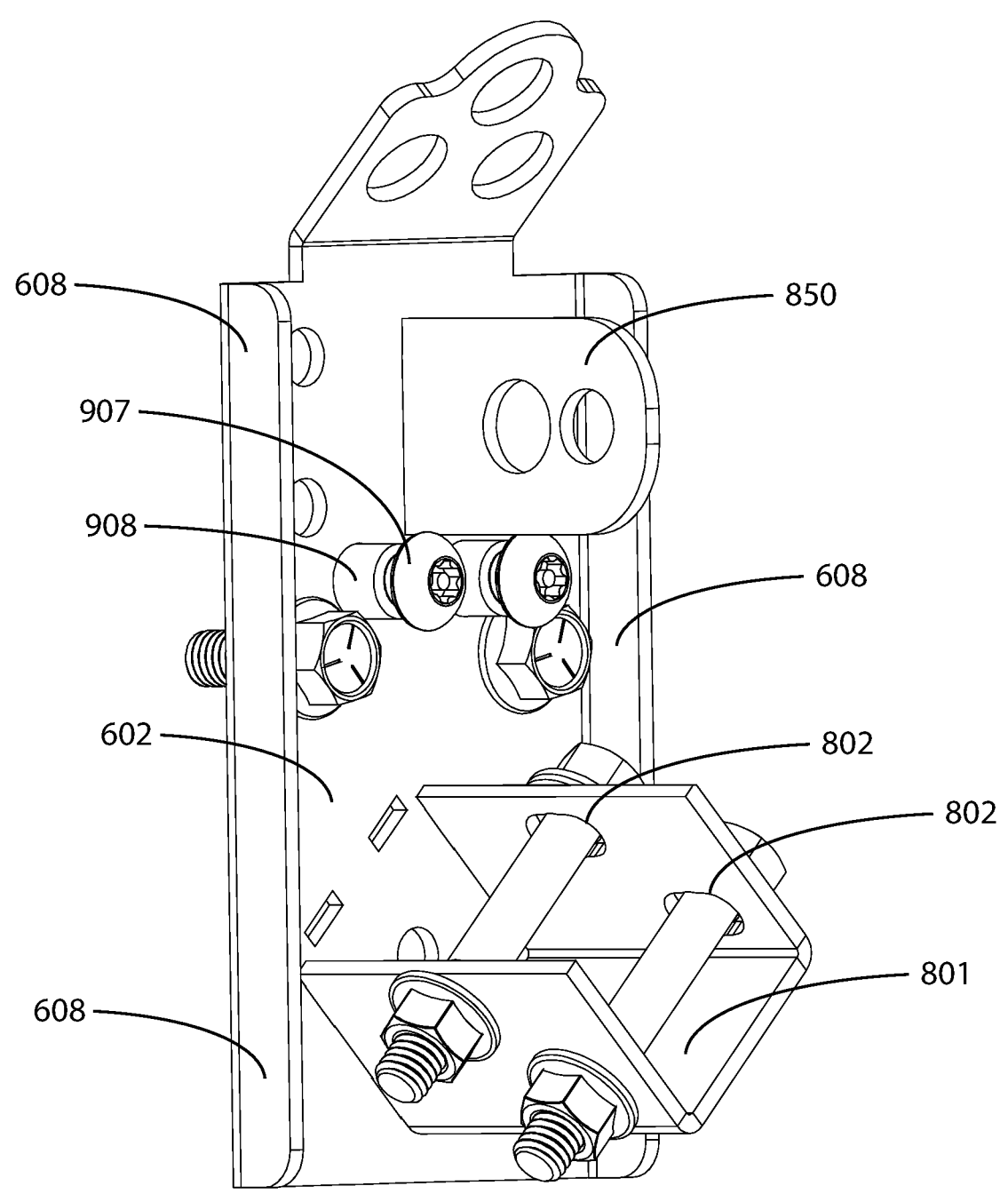
FIG. 24 shows an isometric view of a mounting system with the security cover removed.
Figure 25:
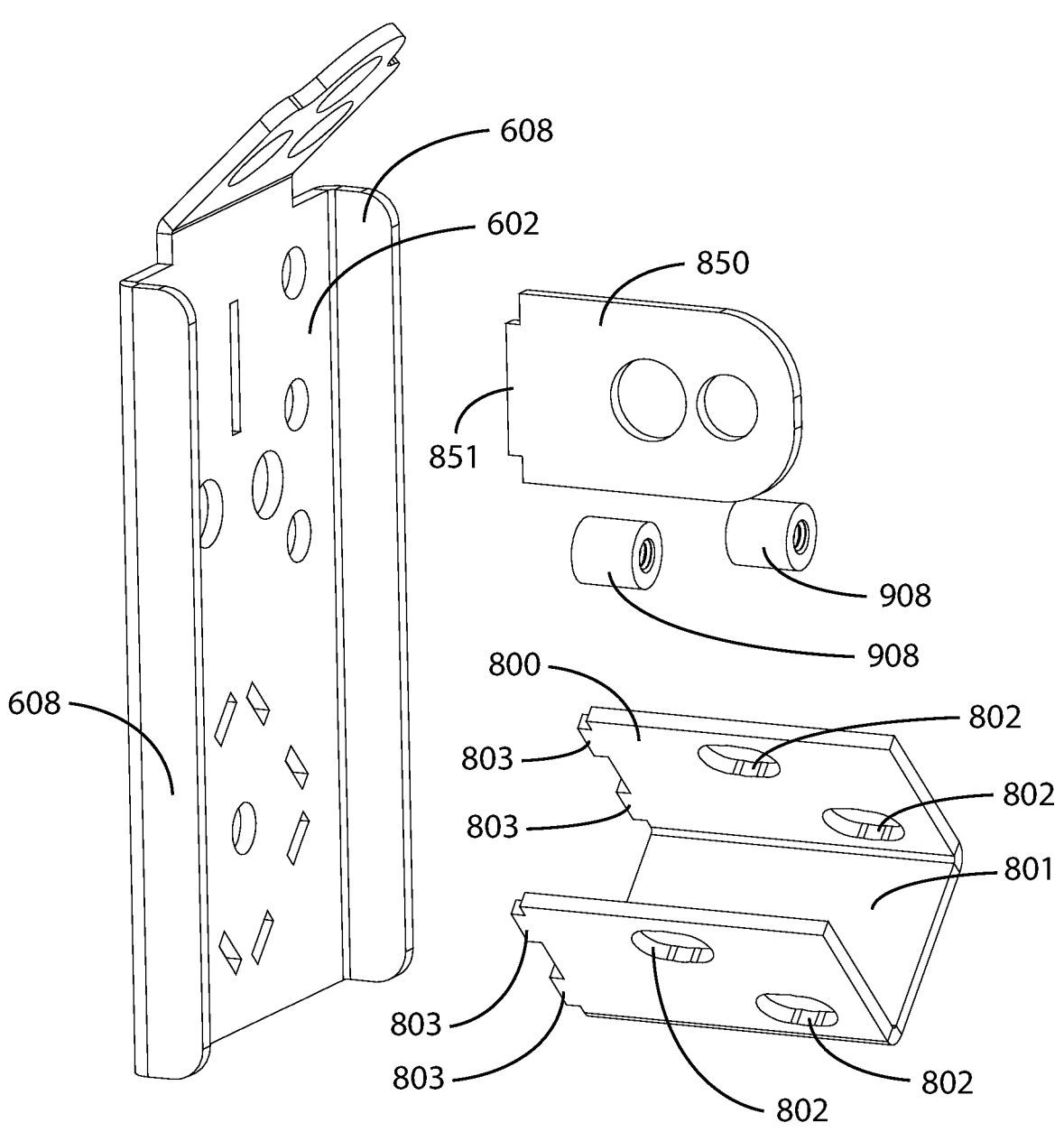
FIG. 25 shows an exploded view of a mounting system.
Figure 26:
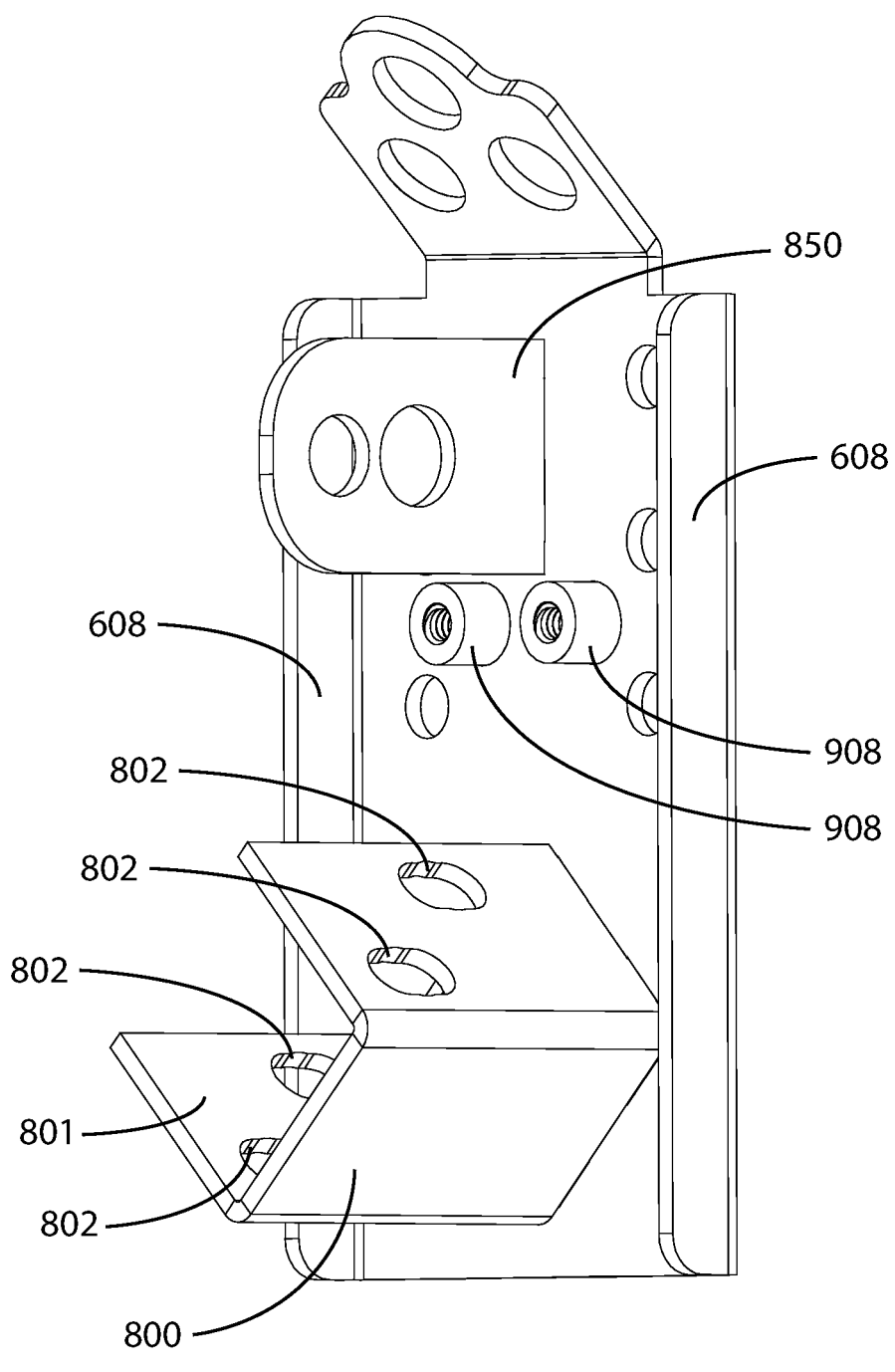
FIG. 26 shows an isometric view of a mounting system with the security cover removed.
Figure 27:
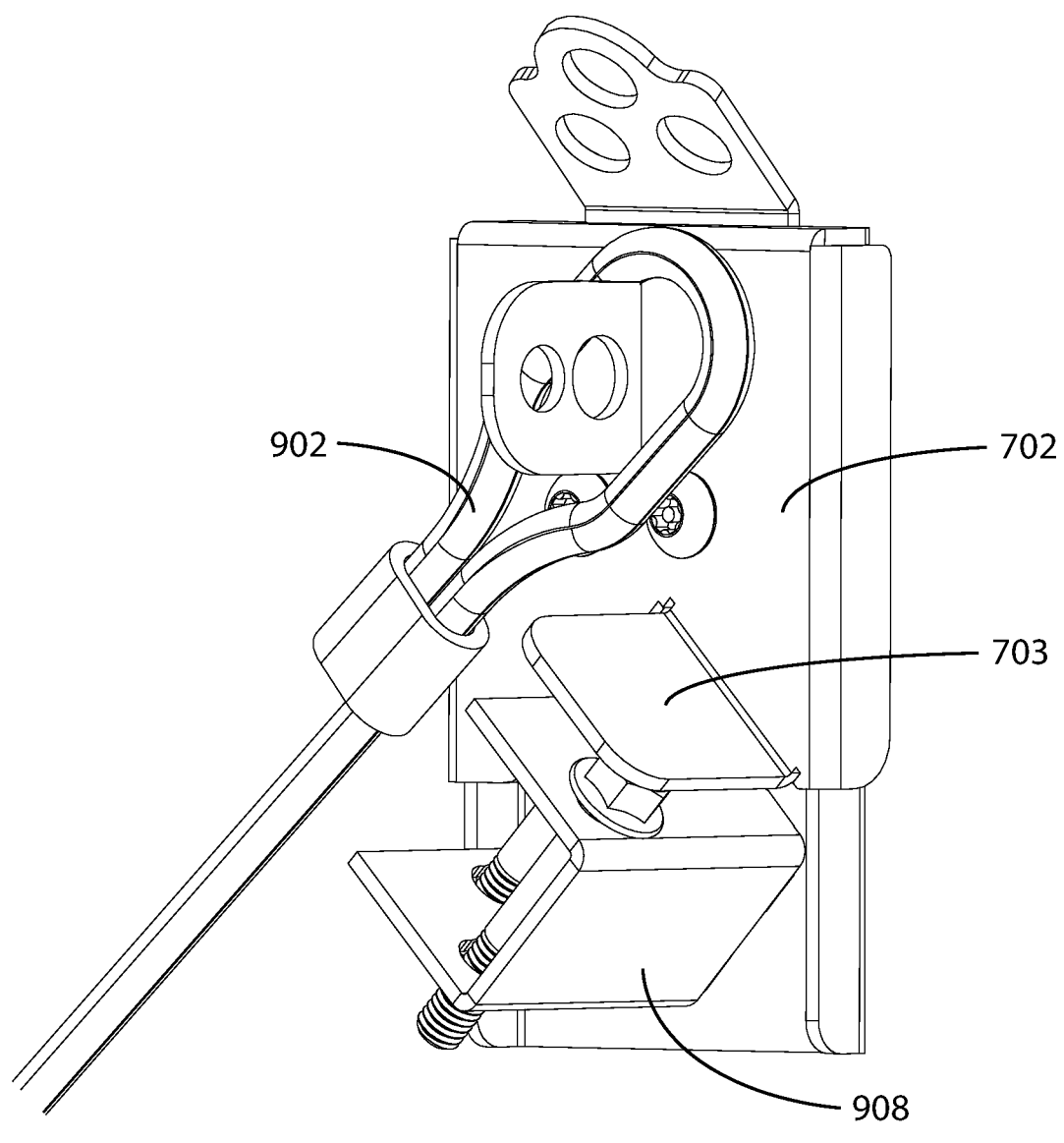
FIG. 27 shows an isometric view of a mounting system with a cable on the bracket lock feature.

The mounting system (600) is shown in FIG. 15-FIG. 27. The mounting plate outer side (603) of the mounting plate (601) is coupled to the cargo area or within the cargo area. The mounting plate inner side (602) may face the cargo area. The mounting plate has mounting plate mounting holes (604) through which mounting plate bolts (906) may pass. In FIG. 23 a series of mounting hole sets placed at vertical intervals, allowing the user to adjust the vertical position of the mounting plate depending on which holes are utilized. The mounting plate also has mounting plate security cover holes (605) the mounting plate security cover holes receive the security cover bolts. Threaded security cover towers (908) may be attached, in some embodiments, welded, to the mounting plate security cover holes. The mounting plate has a lock tab slot (606) into which the bracket lock feature tab (851) of the bracket lock feature (850) may be inserted and attached, in some embodiments, welded. The mounting plate has mounting plate cross-member slots (607) into which the cross-member receiver bracket tabs (803) may be inserted and attached, in some embodiments, welded. The cross-member receiver bracket can have a cross-member receiver bracket cradle (801) with appropriate geometry to receive the cross-member. The cross-member receiver bracket may also have cross-member receiver bracket holes through which the cross-member bolts may pass. The cross-member may have a plurality of cross-member apertures (104) passing laterally through the cross-member. The cross-member apertures line up with the cross-member receiver bracket holes when the cross-member (101) is installed in the cross-member receiver bracket. The cross-member receiver bracket holes in this embodiment are elongated slots making it easier to line up the cross-member apertures with the cross-member receiver bracket holes. The mounting plate has mounting plate side walls (608) which may serve several functions including increasing the strength and improving protection from tampering. The mounting plate may be configured with a mounting plate tie-down anchor (610) having one or more mounting plate anchor attachment features (609) to which cargo restraints may be applied. A mounting plate tie-down anchor allows the user to apply a cargo restraint from the mounting plate or mounting system to the cargo. The mounting plate tie-down anchor allows the user to apply a tension cargo restraint from the mounting plate or mounting system to the cargo.

Figure 29:
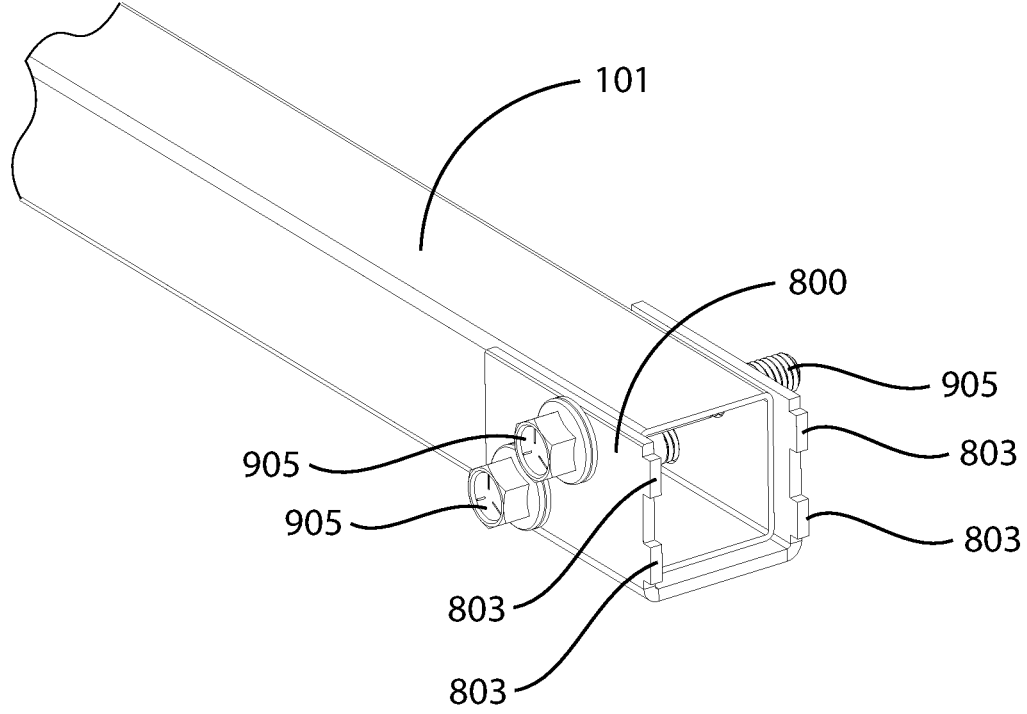
FIG. 29 shows a cross-member installed in a cross-member receiver bracket.
Figure 30:
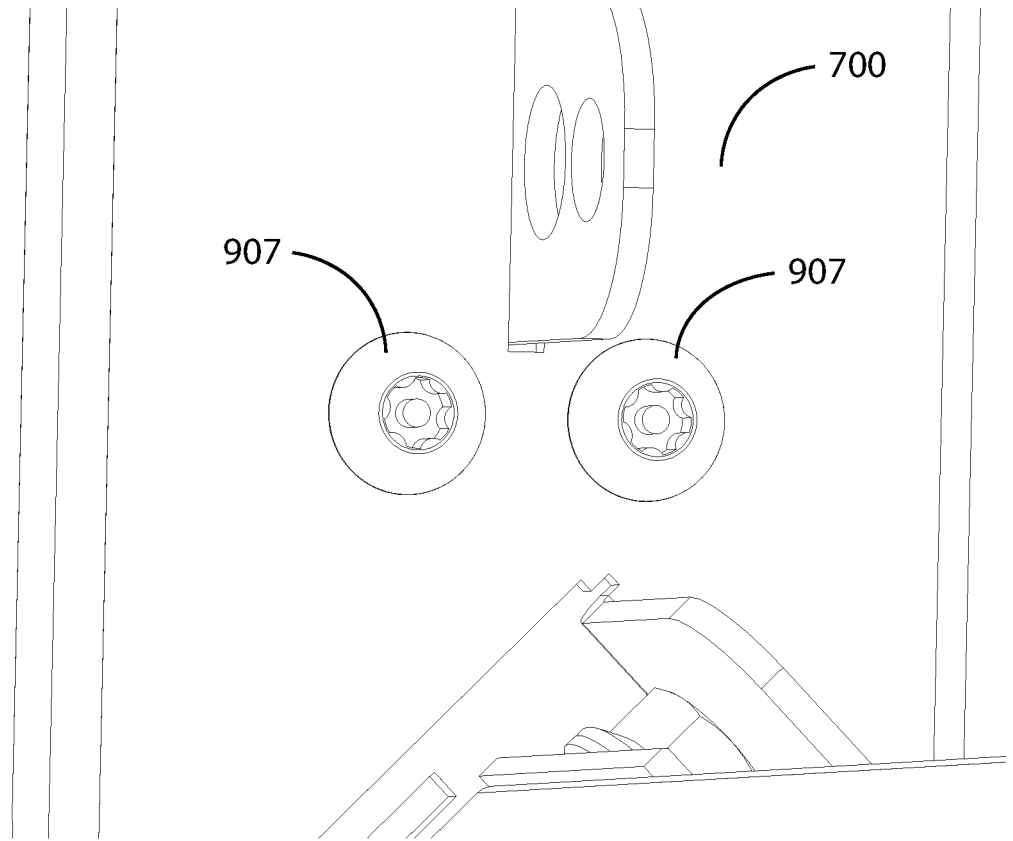
FIG. 30 shows a macro view of the security cover bolts.

As shown in FIG. 29 The cross-member (101) is coupled to the cross-member receiver bracket (800). The cross-member may be disposed within the U-shaped cross-member receiver bracket cradle (801) shown in FIG. 24. One or more cross-member bolts (905) are passed through one crossmember receiver bracket hole (802), through a set of aligned cross-member apertures (104), through a second cross member receiver bracket hole (802), and secured by a cross-member nut (909). The cross-member hardware (903) couples the cross-member to the cross-member receiver bracket. The cross-member receiver bracket tabs (803) may be inserted into, and attached to, mounting plate cross-member slot (607) to improve the strength and accuracy of the attachment of the cross-member receiver bracket to the mounting plate (601).

Figure 31:
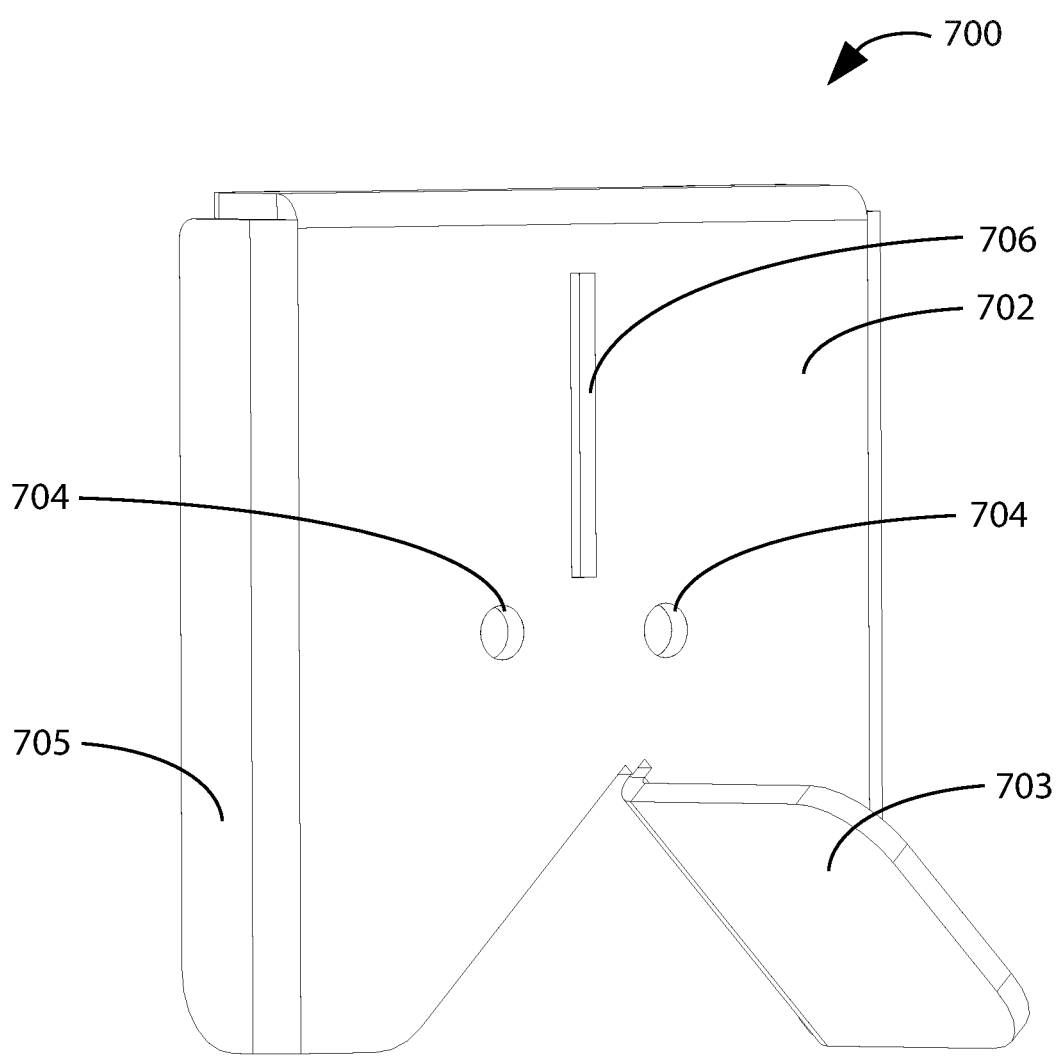
FIG. 31 shows an isometric view of the security cover outer side.
Figure 32:
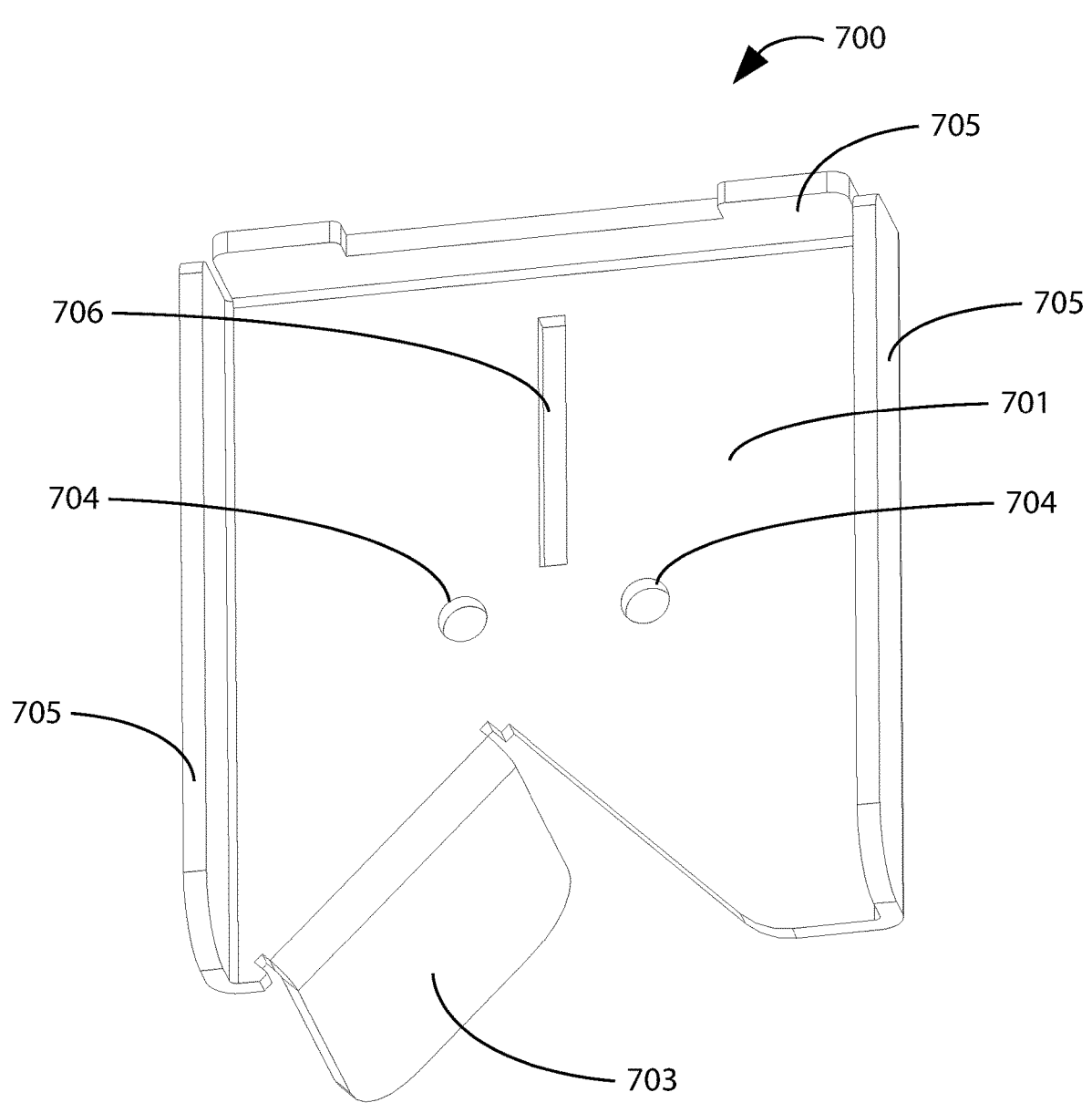
FIG. 32 shows an isometric view of the security cover inner side.

A security cover (700) may be disposed over the mounting plate inner side (602) to prevent or inhibit unwanted tampering, vandalism, or theft of the cargo fixture apparatus or the cargo. The security cover may form a panel which protrudes away from a security cover outer side (702). The security cover is not required in all embodiments of the mounting system (600). As shown in FIG. 31 and FIG. 32 the security cover has a security cover inner side (701) which faces the mounting plate and a security cover outer side (702) which faces the cargo area. The security cover may also have a security cover bolt blocking feature (703) which is configured such that even if a thief removes the cross-member nuts (909) the cross-member bolts (905) may not be removed until the security cover is removed. The security cover has security cover bolt holes (704) which pass between the security cover's inner and outer sides. Security cover bolts (907) pass through the security cover bolt holes and are threaded into the threaded security cover towers (908). The security cover has security cover side walls (705) which may serve several functions including increasing the strength and improving protection. The security cover has a security cover lock feature slot (706) such that the bracket lock feature (850) may pass through the security cover lock feature slot. The bracket lock feature shown in FIG. 16 has a lock aperture (852) through which a lock (901) may be installed by the user. A cable (902) can be installed around the bracket lock feature before installing the lock. The cable may then be passed through articles of cargo to secure them from theft.

Figure 15:
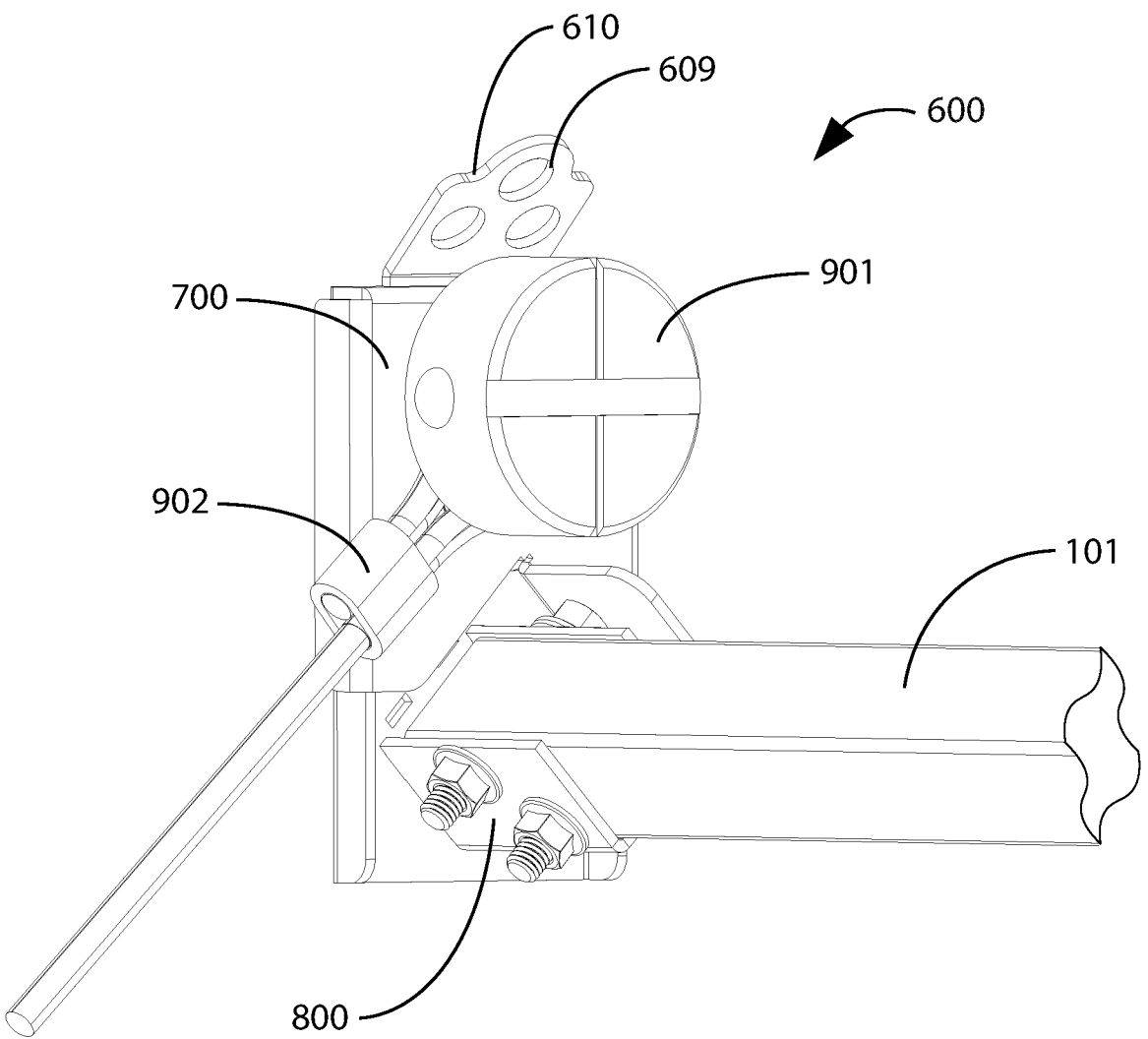
FIG. 15 shows an isometric view of a mounting system with the cross-member.
Figure 16:
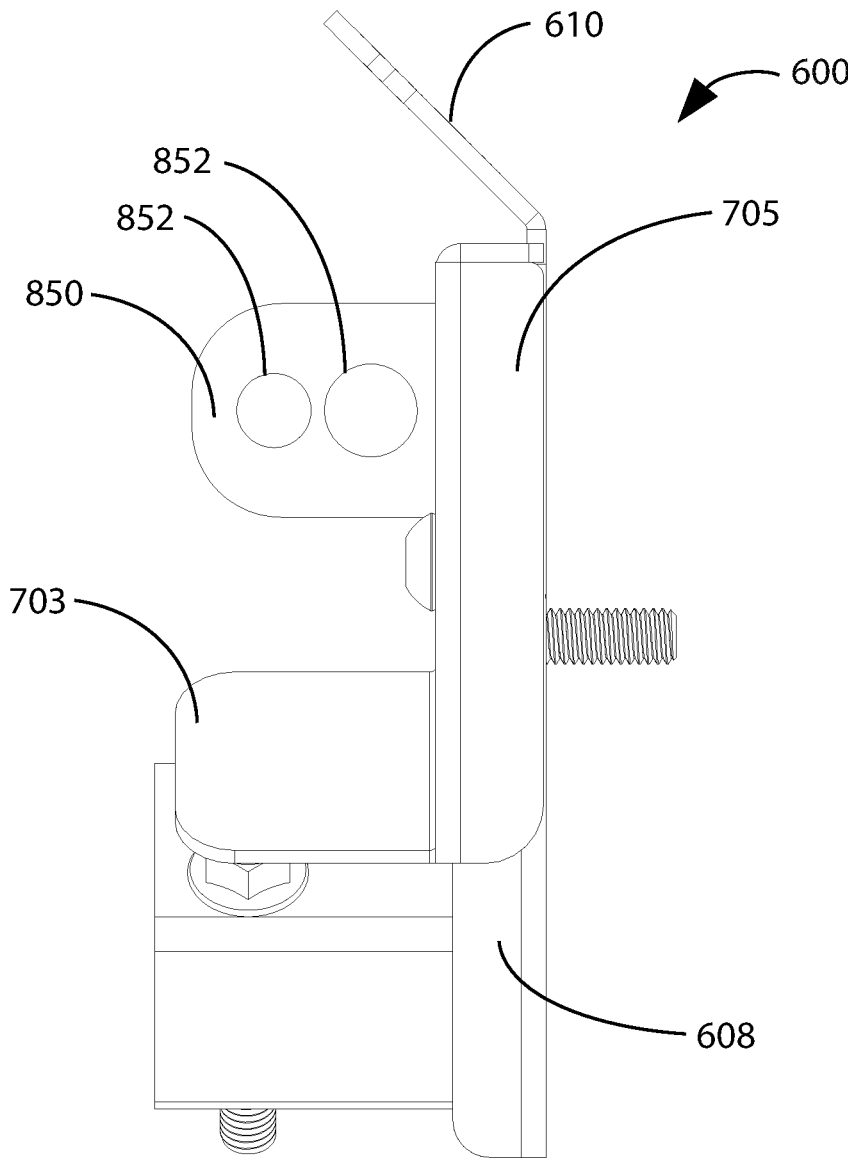
FIG. 16 shows a front view of a mounting system.
Figure 17:
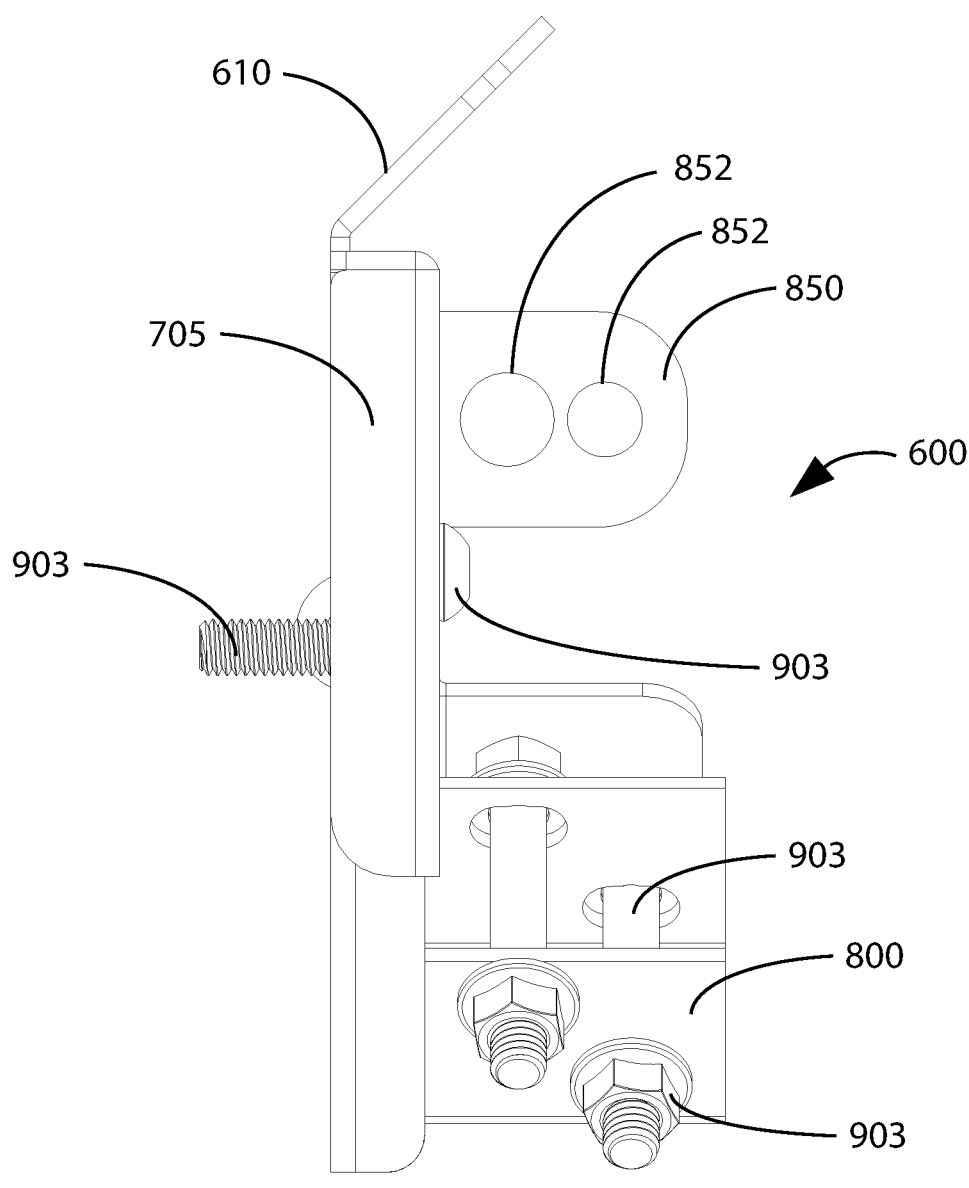
FIG. 17 shows a rear view of a mounting system.
Figure 18:
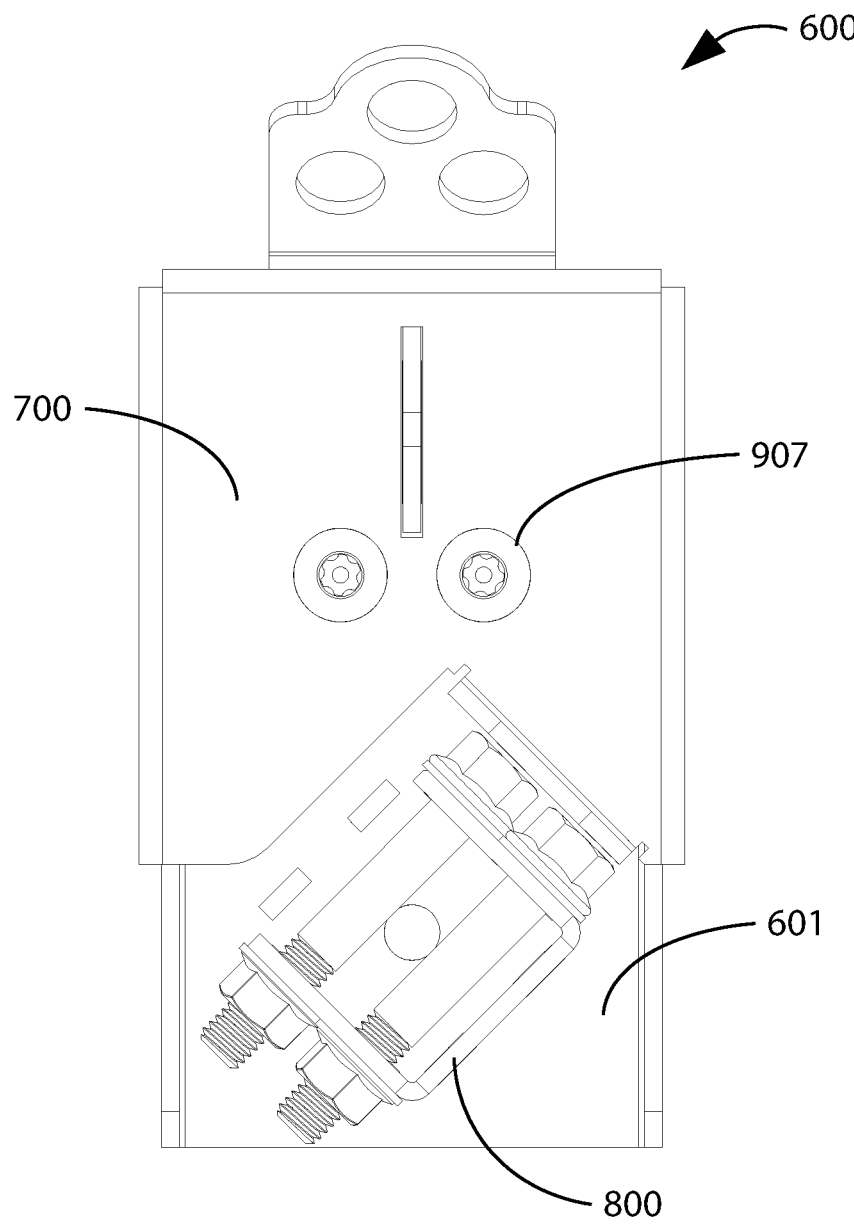
FIG. 18 shows an inside view of a mounting system.
Figure 19:
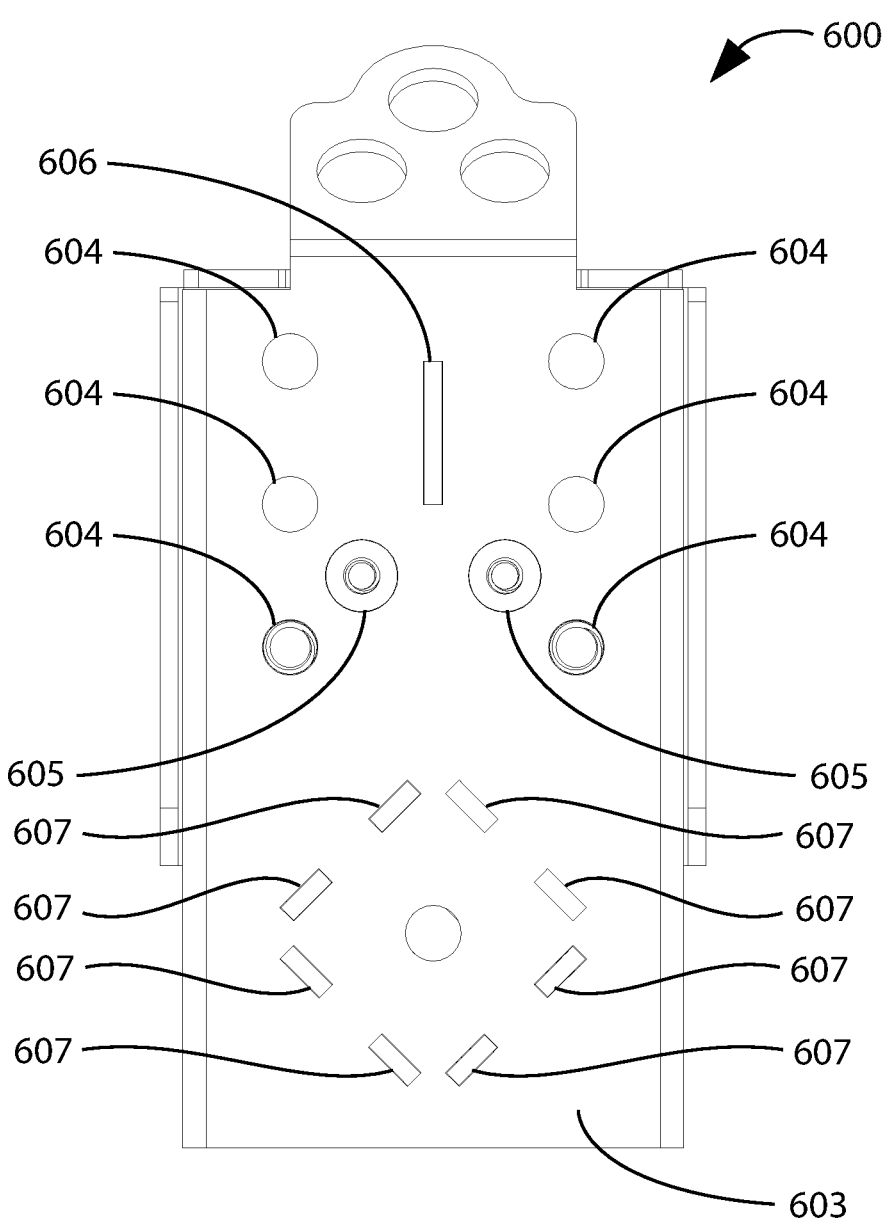
FIG. 19 shows an outside view of a mounting system.
Figure 20:
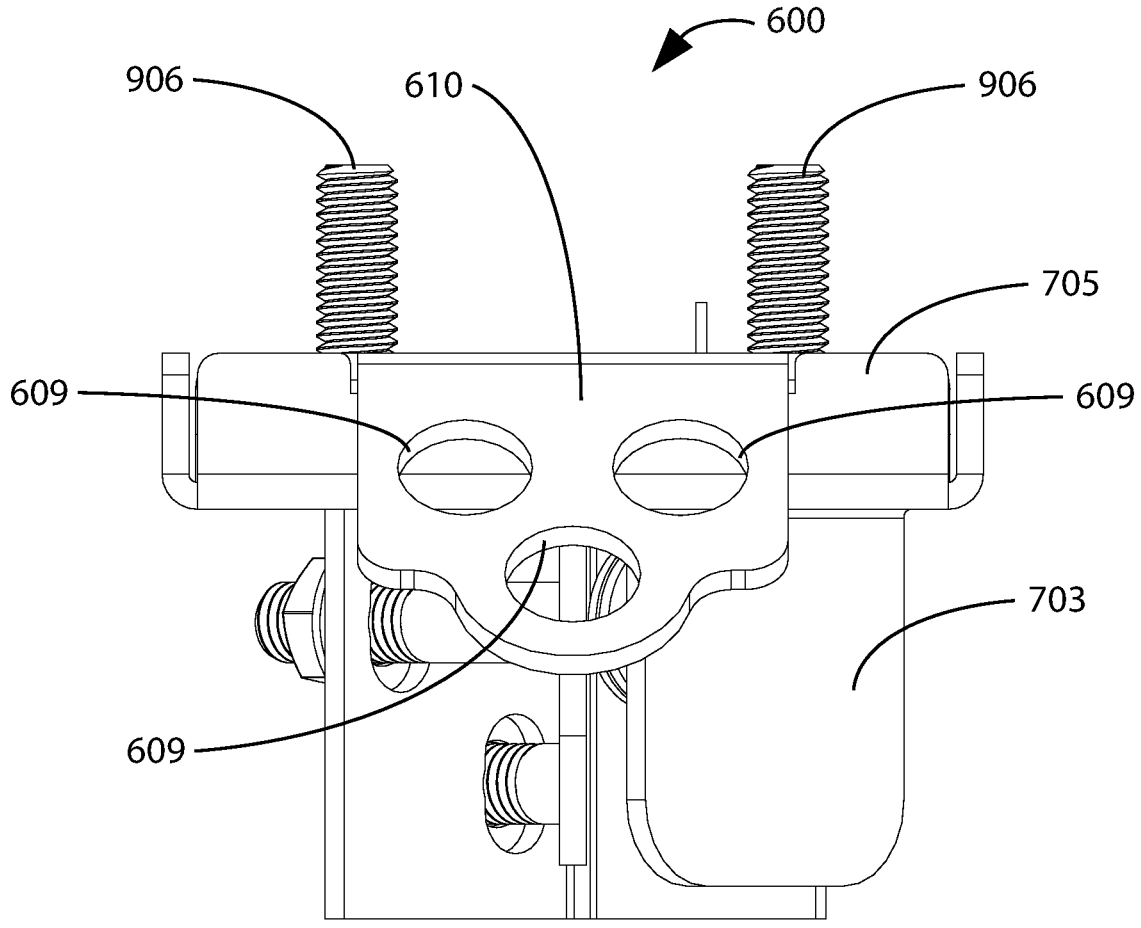
FIG. 20 shows a top view of a mounting system.
Figure 21:
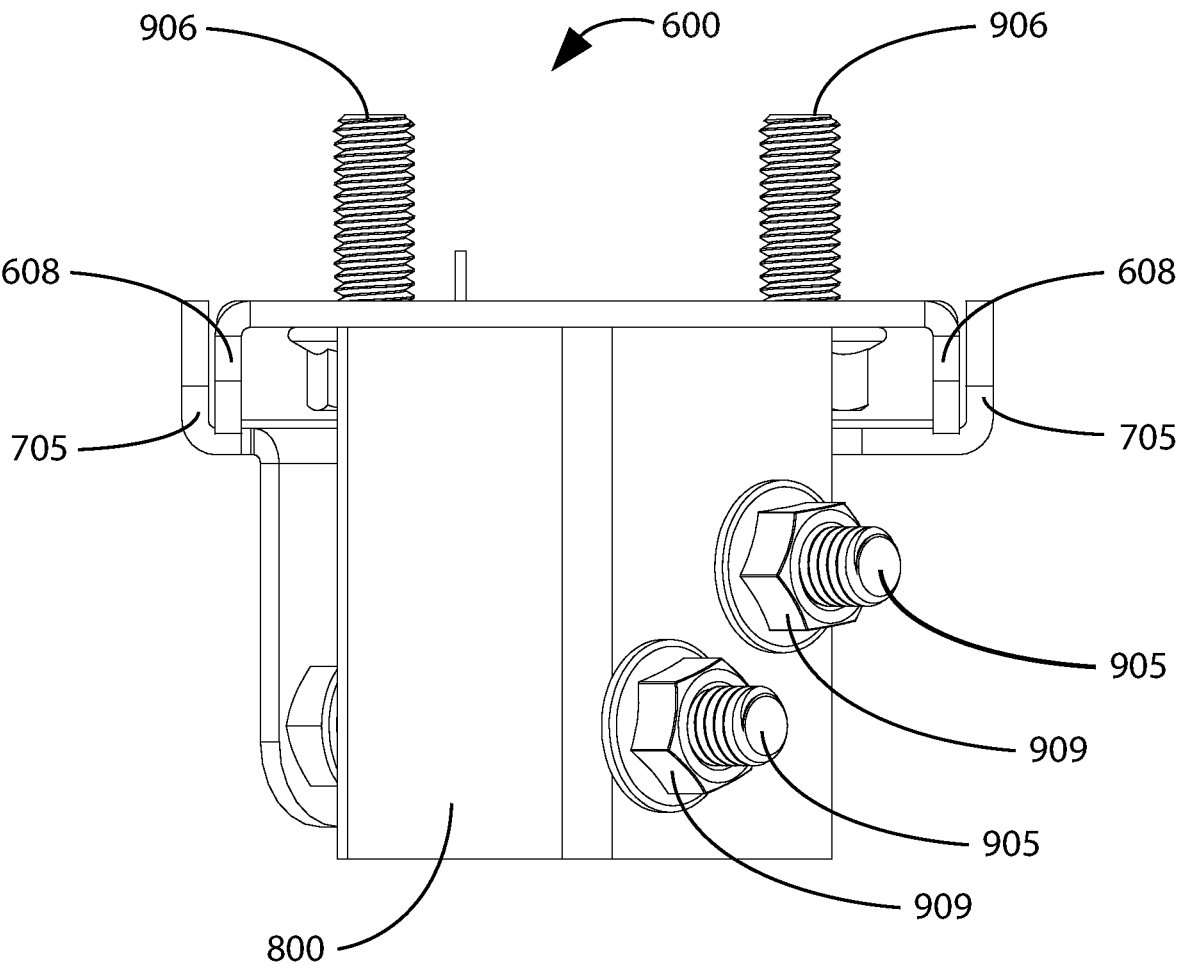
FIG. 21 shows a bottom view of a mounting system.
Figure 22:
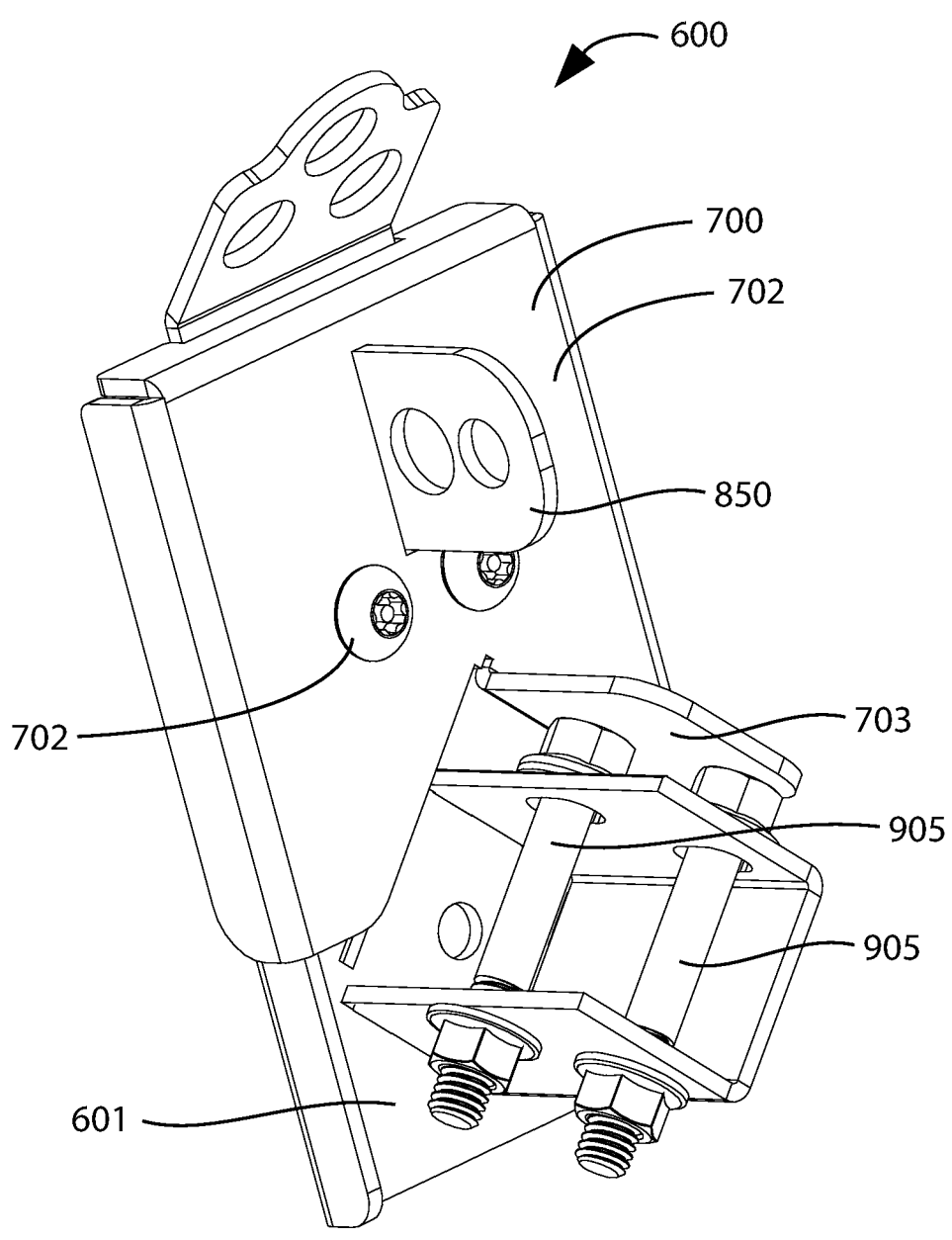
FIG. 22 shows an isometric view of a mounting system.
Figure 28A:
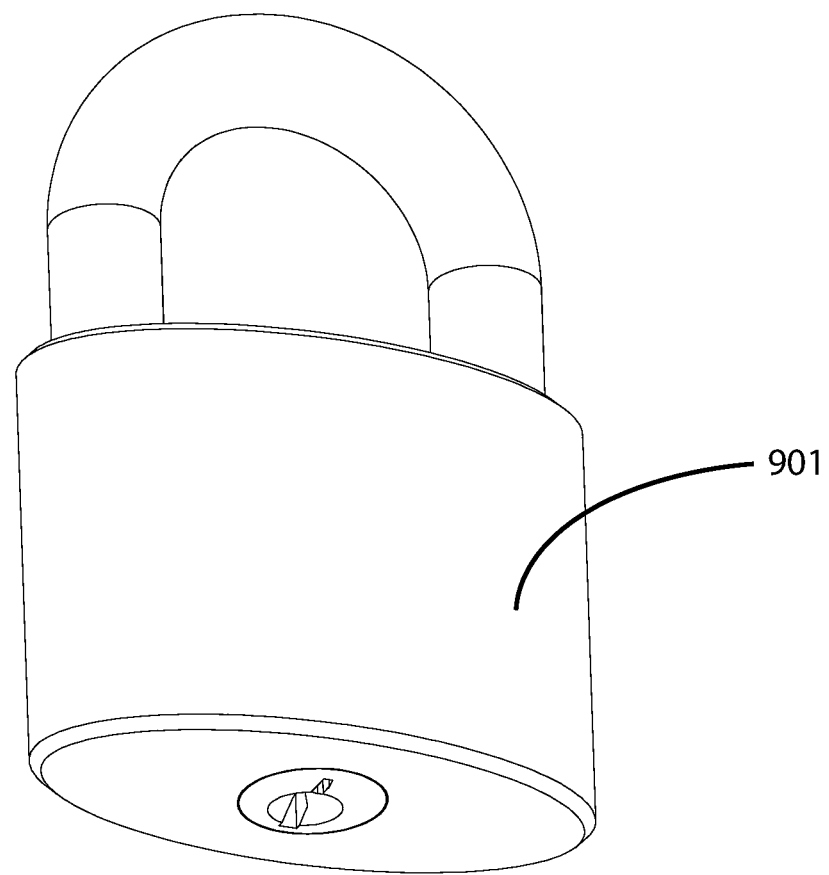
FIG. 28A shows an isometric view of a lock in accordance with a first illustrated embodiment of a lock.
Figure 28B:
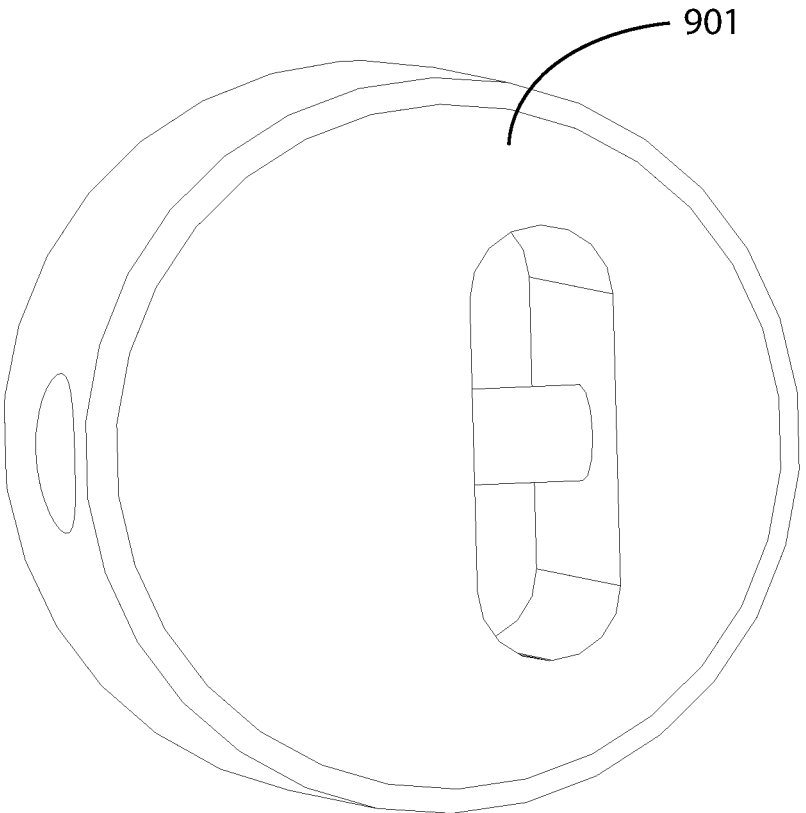
FIG. 28B shows an isometric view of a lock in accordance with a second illustrated embodiment of a lock.

Various embodiments of the bracket lock feature (850) and lock (901) are shown in FIG. 15, FIG. 28A, and FIG. 28B. Various articles of hardware (903) are shown throughout the cargo fixture apparatus drawings. The specific articles of hardware, or fasteners, which may be used are not limited to those shown in the drawings.

Figure 33:
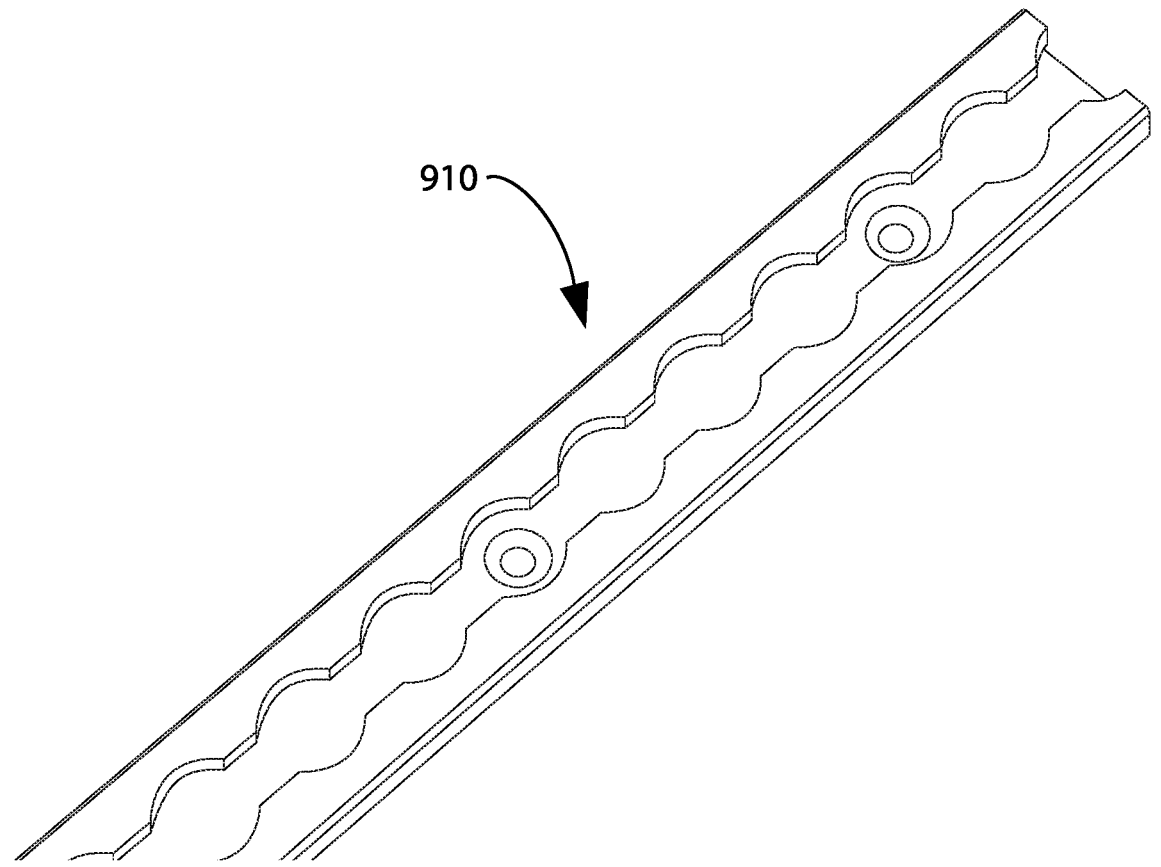
FIG. 33 shows an example of a L-track mounting system.

In FIG. 33 an example of an L-track (910) mounting system is shown.

FEATURE LIST

Cargo Fixture Apparatus (100)
Cross-member (101)
Clamping Block (102)
Tire Cup (103)
Cross-member apertures (104)
Cargo Blocking Surface (105)
Longitudinal Axis (106)
Upper Jaw (200)
Upper Contact Arm1 (201)
Upper Contact Arm2 (202)
Upper Contact Arm Aperture (203)
Upper Tire Cup1 (204)
Upper Tire Cup2 (205)
Upper Tire Cup3 (206)
Upper Jaw Clamp End (207)
Upper Jaw Block End (208)
Upper Jaw Contact Surface (209)
Lower Jaw (300)
Lower Contact Arm1 (301)
Lower Contact Arm2 (302)
Lower Contact Arm Aperture (303)
Lower Tire Cup1 (304)
Lower Tire Cup2 (305)
Lower Tire Cup3 (306)
Lower Jaw Clamp End (307)
Lower Jaw Block End (308)
Lower Jaw Contact Surface (309)

Upper Load-transfer Pin (400)
Upper Load-transfer Pin Through Hole (401)
Upper Load-transfer Pin Shoulder1 (402)
Upper Load-transfer Pin Shoulder2 (403)
Upper Load-transfer Pin Slot1 (404)
Upper Load-transfer Pin Slot2 (405)
Interior Pin Diameter (406)
Most Distal Pin Diameter (407)
Smaller Diameter Shoulder (408)
Lower Load-transfer Pin (450)
Lower Load-transfer Pin Threaded Holes (451)
Lower Load-transfer Pin Shoulder1 (452)
Lower Load-transfer Pin Shoulder2 (453)
Interior Pin Diameter (454)
Smaller Diameter Shoulder (455)
Block Tie-down Anchor (500)
Anchor Hole (501)
Anchor Attachment Feature (502)
Mounting System (600)
Mounting Plate (601)
Mounting Plate Inner Side (602)
Mounting Plate Outer Side (603)
Mounting Plate Mounting Hole (604)
Mounting Plate Security Cover Hole (605)
Mounting Plate Lock Tab Slot (606)
Mounting Plate Cross-Member Slot (607)
Mounting Plate Side Wall (608)
Mounting Plate Anchor Attachment Feature (609)
Mounting Plate Tie-down Anchor (610)
Security Cover (700)
Security Cover Inner Side (701)
Security Cover Outer Side (702)
Security Cover Bolt Blocking Feature (703)
Security Cover Bolt Holes (704)
Security Cover Side Wall (705)
Security Cover Lock Feature Slot (706)
Cross-member Receiver Bracket (800)
Cross-member Receiver Bracket Cradle (801)
Cross-member Receiver Bracket Hole (802)
Cross-member Receiver Bracket Tab (803)
Bracket Lock Feature (850)
Bracket Lock Feature Tab (851)
Lock Aperture (852)
Lock (901)
Cable (902)
Hardware (903)
Clamp Bolt (904)
Cross-member Bolt (905)
Mounting Plate Bolt (906)
Security Cover Bolt (907)
Threaded Security Cover Tower (908)
Cross-member Nut (909)
L-track (910)

What is claimed is:

1. A cargo fixture apparatus, comprising:
   a. A cross-member; the cross-member being an elongated member having a first end, a second end opposite the first end, and a middle length spanning between the first end and second end, the cross-sectional shape of the cross-member being a square shape,
   b. A clamping block; the clamping block comprising an upper jaw, a lower jaw, an upper load-transfer pin, a lower load-transfer pin, and a plurality of clamp bolts,
      i. the upper jaw comprising an upper jaw clamp end and an upper jaw block end, the upper jaw clamp end comprising two upper contact arms, each upper contact arm being geometrically shaped to be clamped to the top side of the cross-member, each upper contact arm configured with an upper contact arm aperture, ii. the lower jaw comprising a lower jaw clamp end and a lower jaw block end, the lower jaw clamp end comprising two lower contact arms, each lower contact arm being geometrically shaped to be clamped to the bottom side of the cross-member, each lower contact arm configured with a lower contact arm aperture, iii. the upper load-transfer pin being an elongated member with a longitudinal axis, the upper load-transfer pin adapted to be inserted into the two upper contact arm apertures, the upper load-transfer pin configured with a plurality of upper load-transfer pin through holes, which are perpendicular to the longitudinal axis of the upper load-transfer pin, iv. the lower load-transfer pin being an elongated member with a longitudinal axis, the lower load-transfer pin adapted to be inserted into the two lower contact arm apertures, the lower load-transfer pin configured with a plurality lower load-transfer pin through holes which are perpendicular to the longitudinal axis of the lower load-transfer pin, the lower load-transfer pin through holes being threaded to receive the clamp bolts, v. The plurality of clamp bolts disposed through the plurality of upper load-transfer pin through holes, the plurality of clamp bolts threaded into the plurality lower load-transfer pin through holes.

2. The cargo fixture apparatus of claim 1, further comprising:

a. A plurality of block tie-down anchors; the block tie-down anchors having an anchor hole and at least one anchor attachment feature, the block tie-down anchor being coupled to the clamping block by inserting the upper load-transfer pin through the anchor hole between the upper contact arms.

3. The cargo fixture apparatus of claim 1, wherein:

a. The rear facing surface of the upper jaw block end forms a concave tire cup.

4. The cargo fixture apparatus of claim 1, wherein:

a. The rear facing surface of the lower jaw block end forms a concave tire cup.

5. The cargo fixture apparatus of claim 1, wherein:

a. The rear facing surface of the upper jaw block end and the rear facing surface of the lower jaw block end form a three concave tire cups of various sizes arranged in a terraced pattern.

6. The cargo fixture apparatus of claim 1, wherein:

a. The lower jaw and the upper jaw are identical.

7. The cargo fixture apparatus of claim 1, wherein:

a. The upper load-transfer pin is radially symmetrical about its central axis, except for the upper load-transfer through holes.

8. The cargo fixture apparatus of claim 1, wherein:

a. The lower load-transfer pin is radially symmetrical about its central axis, except for the lower load-transfer through holes.

9. The cargo fixture apparatus of claim 1, wherein:

a. The upper load-transfer pin is configured with load-transfer pin shoulder features.

10. The cargo fixture apparatus of claim 1, wherein:

a. The upper load-transfer pin is configured with a load-transfer pin slot.

11. The cargo fixture apparatus of claim 1, wherein:

a. The cross-member is an article of square tubing.

12. The cargo fixture apparatus of claim 1, wherein:

a. The cross-member is oriented at an angle between 30 degrees and 60 degrees with respect to horizontal.

13. The cargo fixture apparatus of claim 1, wherein a. The cross-member is rotationally oriented to 45 degrees with respect to horizontal.

14. A cargo fixture apparatus, comprising:

a. A cross-member; the cross-member being an elongated member having a first end, a second end opposite the first end, and a middle length spanning between the first end and second end, the cross-sectional shape of the cross-member being a square shape, b. A clamping block; the clamping block comprising an upper jaw, a lower jaw, an upper load-transfer pin, a lower load-transfer pin, and a plurality of clamp bolts, i. the upper jaw comprising an upper jaw clamp end and an upper jaw block end, the upper jaw clamp end comprising two upper contact arms, each upper contact arm being geometrically shaped to be clamped to the top side of the cross-member, each upper contact arm configured with an upper contact arm aperture, ii. the lower jaw comprising a lower jaw clamp end and a lower jaw block end, the lower jaw clamp end comprising two lower contact arms, each lower contact arm being geometrically shaped to be clamped to the bottom side of the cross-member, each lower contact arm configured with a lower contact arm aperture, iii. the upper load-transfer pin being an elongated member with a longitudinal axis, the upper load-transfer pin adapted to be inserted into the two upper contact arm apertures, the upper load-transfer pin configured with a plurality of upper load-transfer pin through holes, which are perpendicular to the longitudinal axis of the upper load-transfer pin, iv. the lower load-transfer pin being an elongated member with a longitudinal axis, the lower load-transfer pin adapted to be inserted into the two lower contact arm apertures, the lower load-transfer pin configured with a plurality lower load-transfer pin through holes which are perpendicular to the longitudinal axis of the lower load-transfer pin, the lower load-transfer pin through holes being threaded to receive the clamp bolts, v. The plurality of clamp bolts disposed through the plurality of upper load-transfer pin through holes, the plurality of clamp bolts threaded into the plurality lower load-transfer pin through holes, b. A plurality of mounting systems; the plurality of mounting system each comprising a mounting plate, a cross-member receiver bracket, mounting plate bolts, and cross-member bolts, i. the mounting plate comprising a panel with a plurality of mounting plate holes passing between a mounting plate inner side and a mounting plate outer side, the mounting plate holes adapted to receive mounting plate bolts, ii. the cross-member receiver bracket being attached to the mounting plate inner side, the cross-member receiver bracket being adapted to receive and couple to the cross member, the cross member having a plurality of cross-member apertures passing laterally though the cross-member, the cross member receiver bracket having a plurality of receiver bracket apertures which align with the plurality of cross-member apertures when the cross-member is assembled in the cross-member receiver bracket, the plurality of cross-member bolts being disposed through a plurality of receiver bracket apertures and through a plurality of cross member apertures, secured therein with a cross-member nut.

15. The cargo fixture apparatus of claim 14, wherein:

a. The plurality of mounting plate holes form a bolt pattern which repeats itself vertically such that the mounting plate may be mounted at more than one vertical elevation within the cargo area.

16. The cargo fixture apparatus of claim 14 wherein:

a. The mounting plate is configured with a mounting plate tie down anchor, the mounting plate tie down anchor configured with a plurality of mounting plate anchor attachment features.

17. The cargo fixture apparatus of claim 14, further comprising:

a. A security cover, a plurality of threaded security cover towers, and a plurality of security cover bolts;

iii. The security cover comprising a panel with a plurality of security cover bolt holes passing between a security cover inner side and a security cover outer side, the security cover bolt holes adapted to receive security cover bolts, iv. The threaded security cover towers being attached to the mounting plate, the threaded security cover towers being aligned with the security cover bolt holes when the security cover is assembled with the mounting plate, v. The plurality of security cover bolts passing through the plurality of security cover bolt holes and threading into the plurality of security cover towers.

18. The cargo fixture apparatus of claim 17, further comprising:

a. A bracket lock feature, and security cover lock feature slot; the bracket lock feature comprising a tab having a lock aperture, the bracket lock feature being attached to the mounting plate, b. The security cover lock feature slot being an aperture passing between the security cover inner side and the security cover outer side, the security cover lock feature slot being adapted to allow the bracket lock feature to pass through the security cover lock feature slot when the security cover is assembled with the mounting plate, the security cover lock feature adapted to allow the shackle of a lock pass through lock aperture when the security cover is assembled with the mounting plate.

19. The cargo fixture apparatus of claim 17, further comprising:

a. A security cover bolt blocking feature; the security cover bolt blocking feature being a panel disposed on the security cover which, when the security cover is installed on the mounting plate, prevents the removal of the cross-member bolts.

20. The cargo fixture apparatus of claim 17, further comprising:

a. Security cover side walls which are panels which extend from the lateral edges of the security cover in the direction of the security cover inner side.

* * * * *